US012023723B2

(12) United States Patent
Kondo

(10) Patent No.: US 12,023,723 B2
(45) Date of Patent: Jul. 2, 2024

(54) DIE CUSHION DEVICE

(71) Applicant: AIDA ENGINEERING, LTD., Kanagawa (JP)

(72) Inventor: Tadahiro Kondo, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 392 days.

(21) Appl. No.: 17/553,418

(22) Filed: Dec. 16, 2021

(65) Prior Publication Data

US 2022/0193748 A1 Jun. 23, 2022

(30) Foreign Application Priority Data

Dec. 18, 2020 (JP) ................................ 2020-209828

(51) Int. Cl.

| | |
|---|---|
| ***B21D 24/14*** | (2006.01) |
| ***B21D 24/02*** | (2006.01) |
| ***B21D 24/08*** | (2006.01) |
| ***B30B 15/16*** | (2006.01) |

(52) U.S. Cl.

CPC ............. *B21D 24/02* (2013.01); *B21D 24/08* (2013.01); *B21D 24/14* (2013.01); *B30B 15/16* (2013.01)

(58) Field of Classification Search

CPC ........ B21D 24/02; B21D 24/08; B21D 24/14; B30B 15/16

USPC ........................... 267/118, 119, 130; 72/20.1

See application file for complete search history.

(56) References Cited

U.S. PATENT DOCUMENTS

| | | | | |
|---|---|---|---|---|
| 10,259,031 B2 * | 4/2019 | Kohno | .................. | B21D 24/14 |
| 10,710,138 B2 * | 7/2020 | Makabe | .................. | B30B 15/16 |
| 2014/0202223 A1 * | 7/2014 | Kohno | .................. | B21D 24/14 72/20.1 |
| 2016/0271675 A1 | 9/2016 | Choi | | |
| 2017/0182539 A1 | 6/2017 | Makabe | | |

(Continued)

FOREIGN PATENT DOCUMENTS

| | | |
|---|---|---|
| CN | 109723700 A | 5/2019 |
| EP | 1882534 A1 | 1/2008 |

(Continued)

OTHER PUBLICATIONS

Extended European Search Report issued on May 3, 2022 for the corresponding European Patent Application No. 21214400.0.

(Continued)

*Primary Examiner* — Christopher P Schwartz
(74) *Attorney, Agent, or Firm* — Rimon PC

(57) ABSTRACT

The die cushion device according to the present invention includes a first hydraulic cylinder and a second hydraulic cylinder that are independently and simultaneously controlled. When a cushion pad is pre-pressurized, pressure control is performed on the first hydraulic cylinder via a first hydraulic circuit so that a pressure in a lower chamber of the first hydraulic cylinder is pre-pressurized to a preset pressure, and position control is simultaneously performed on the second hydraulic cylinder via a second hydraulic circuit so that the cushion pad is held in the die cushion standby position. A force with which the first hydraulic cylinder moves the cushion pad upward is balanced with a force with which the second hydraulic cylinder moves the cushion pad downward (a force for holding the die cushion standby position).

14 Claims, 12 Drawing Sheets

(56) References Cited

U.S. PATENT DOCUMENTS

| | | | | |
|---|---|---|---|---|
| 2018/0117656 | A1 | 5/2018 | Kohno | |
| 2018/0243811 | A1 | 8/2018 | Kohno | |
| 2019/0232353 | A1 | 8/2019 | Kohno | |
| 2022/0203642 | A1 * | 6/2022 | Tabata .................. | B30B 15/148 |

FOREIGN PATENT DOCUMENTS

| | | | |
|---|---|---|---|
| EP | 3115119 | A1 | 1/2017 |
| JP | S61-205619 | U | 12/1986 |
| JP | H07-024600 | A | 1/1995 |
| JP | 2010-046691 | A | 3/2010 |
| JP | 2014-140871 | A | 8/2014 |
| JP | 2017-113786 | A | 6/2017 |
| JP | 2018-069297 | A | 5/2018 |
| JP | 2018-140405 | A | 9/2018 |

OTHER PUBLICATIONS

Decision to Grant a Patent received in Japanese Patent Application No. 2020-209828, issued Oct. 20, 2023.

* cited by examiner

DIE CUSHION DEVICE

CROSS-REFERENCE TO RELATED APPLICATIONS

The present application claims priority under 35 U.S.C. § 119 to Japanese Patent Application No. 2020-209828 filed on Dec. 18, 2020. The above application is hereby expressly incorporated by reference, in its entirety, into the present application.

BACKGROUND OF THE INVENTION

Field of the Invention

The present invention relates to a die cushion device, and particularly relates to a technique for pressurizing (pre-pressurizing) a cushion pad when a cushion pad is positioned at a die cushion standby position.

Description of the Related Art

Conventionally, a die cushion device capable of pre-pressurizing the cushion pad in a case where the cushion pad is positioned at the die cushion standby position has been proposed (Japanese Patent Application Laid-Open No. 2017-113786).

The die cushion device described in Japanese Patent Application Laid-Open No. 2017-113786 includes: a hydraulic cylinder that supports the cushion pad and generates a die cushion force in a case where a slide of a press machine is moved downward; a first hydraulic circuit connected to a head side hydraulic chamber (lower chamber) of a hydraulic cylinder; and a second hydraulic circuit connected to a rod-side hydraulic chamber (upper chamber) thereof, and when the cushion pad is positioned at a die cushion standby position, a pilot-operated check valve (pilot check valve) of the second hydraulic circuit prevents hydraulic oil from flowing out from the upper chamber of the hydraulic cylinder, and the first hydraulic circuit supplies pressure oil to the lower chamber of the hydraulic cylinder to pre-pressurize the cushion pad.

CITATION LIST

Patent Literature 1: Japanese Patent Application Laid-Open No. 2017-113786

SUMMARY OF THE INVENTION

The die cushion device described in Japanese Patent Application Laid-Open No. 2017-113786 supplies pressure oil to a lower chamber of a hydraulic cylinder to pre-pressurize a cushion pad when the cushion pad is positioned at a die cushion standby position, in a state in which hydraulic oil is prevented from flowing out from an upper chamber of the hydraulic cylinder. Therefore, the hydraulic oil in the upper chamber of the hydraulic cylinder is compressed, and the cushion pad is slightly moved upward.

The present invention has been made in view of such circumstances, and aims to provide a die cushion device capable of satisfactorily pre-pressurizing a cushion pad in a case where the cushion pad is positioned at the die cushion standby position.

In order to achieve the above object, the die cushion device according to a first aspect of the present invention includes: a first hydraulic cylinder configured to support a cushion pad and generate a die cushion force on the cushion pad in a case where a slide of a press machine is moved downward; a first hydraulic circuit configured to drive the first hydraulic cylinder; a first pressure commander configured to output a first pressure command indicating a die cushion pressure corresponding to the die cushion force; a first pressure detector configured to detect a pressure applied to a lower chamber of the first hydraulic cylinder; a first controller configured to control the first hydraulic circuit based on the first pressure command and the pressure detected by the first pressure detector, in such a manner that the pressure applied to the lower chamber of the first hydraulic cylinder matches a pressure corresponding to the first pressure command; a second hydraulic cylinder configured to support the cushion pad and move the cushion pad in an up-and-down direction; a second hydraulic circuit configured to drive the second hydraulic cylinder; a die cushion position commander configured to output a die cushion position command indicating a position of the cushion pad; a die cushion position detector configured to detect a position of the cushion pad; and a second controller configured to control the second hydraulic circuit based on the die cushion position command and the position of the cushion pad detected by the die cushion position detector, in such a manner that the position of the cushion pad matches a position corresponding to the die cushion position command, wherein: the first pressure commander outputs a second pressure command for pre-pressurizing the lower chamber of the first hydraulic cylinder to a preset pressure before press forming; the die cushion position commander outputs a first die cushion position command for causing the cushion pad to stand by at a die cushion standby position before press forming; the first controller controls the first hydraulic circuit based on the second pressure command and the pressure detected by the first pressure detector, to pre-pressurize the lower chamber of the first hydraulic cylinder to a pressure corresponding to the second pressure command; and the second controller controls the second hydraulic circuit based on the first die cushion position command, to cause the cushion pad to stand by at the die cushion standby position.

According to the first aspect of the present invention, when the cushion pad is pre-pressurized in a state where the cushion pad is positioned at the die cushion standby position and the slide of the press machine and the cushion pad are separated with each other, pressure control is performed on the first hydraulic cylinder in such a manner that the lower chamber of the first hydraulic cylinder is pre-pressurized to the preset pressure, and position control is performed on the second hydraulic cylinder in such a manner that the cushion pad is positioned at the die cushion standby position. Even when the desired pressure liquid is supplied to the lower chamber of the first hydraulic cylinder for pre-pressurization, the cushion pad may not be moved upward since the cushion pad is subjected to position control to be positioned at the die cushion standby position.

DETAILED DESCRIPTION OF THE PREFERRED EMBODIMENTS

Preferred embodiments of a die cushion device according to the present invention will be described below in detail with reference to the accompanying drawings.

Figure 1:
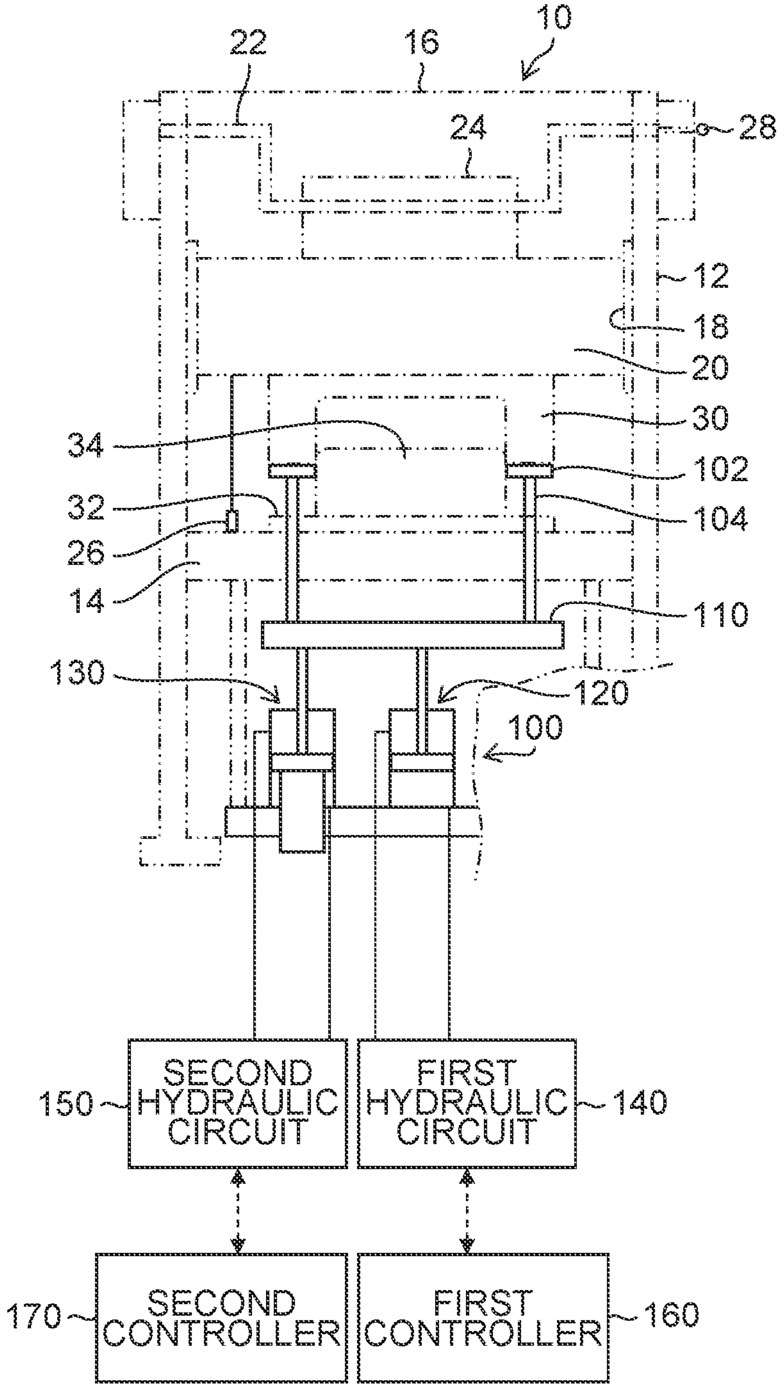
FIG. 1 is a configuration diagram showing a press machine provided with a die cushion device according to embodiments of the present invention.

FIG. 1 is a configuration diagram showing a press machine provided with the die cushion device according to the embodiments of the present invention.

In the press machine 10 shown in FIG. 1, a frame includes columns 12, a bed 14, and a crown (strength member at the top of the frame) 16. A slide 20 is movably guided in the up-and-down direction (vertical direction) by guide parts 18 provided on the columns 12.

The driving force of the slide 20 is transmitted from the servomotor via the crankshaft 22 and the connecting rod 24, and the slide 20 is moved in the up-and-down direction on FIG. 1.

A slide position detector 26 configured to detect a position of the slide 20 is provided on the bed 14 side of the press machine 10. A crankshaft encoder 28 configured to individually detect an angle and an angular velocity of the crankshaft 22 is provided on the crankshaft 22.

An upper die 30 is mounted on the slide 20, and a lower die 34 is mounted on a bolster 32 of the bed 14.

Between the upper die 30 and the lower die 34, a blank holder (wrinkle holding plate) 102 is arranged. The lower side of the blank holder 102 is supported by the cushion pad 110 via a plurality of cushion pins 104. A blank is set on (in contact with) the upper side of the blank holder 102.

The press machine 10 press-forms the blank between the upper die 30 and the lower die 34 by moving the slide 20 downward. The die cushion device 100 presses the peripheral edge of the blank to be press-formed from below.

The die cushion device 100 includes: blank holders 102; a cushion pad 110 that supports the blank holders 102 via the plurality of cushion pins 104; a first hydraulic cylinder 120 that supports the cushion pad 110 and generates a die cushion force on the cushion pad 110; a second hydraulic cylinder 130 that supports the cushion pad 110 and moves the cushion pad 110 in the up-and-down direction; a first hydraulic circuit 140 that drives the first hydraulic cylinder 120; a second hydraulic circuit 150 that drives the second hydraulic cylinder 130; and a first controller 160 and a second controller 170 that control the first hydraulic circuit 140 and the second hydraulic circuit 150, respectively.

The first hydraulic cylinder 120 functions as a hydraulic cylinder that generates a die cushion force on the cushion pad 110 by pressure control by the first hydraulic circuit 140 and the first controller 160. The second hydraulic cylinder 130 functions as a hydraulic cylinder that moves the cushion pad 110 to a desired position in the up-and-down direction by position control by the second hydraulic circuit 150 and the second controller 170. In other words, the first hydraulic cylinder 120 is subjected to pressure control and the second hydraulic cylinder 130 is mainly subjected to position control, and they are hydraulic cylinders having different functions from each other.

First Embodiment of First and Second Hydraulic Circuits

Figure 2:
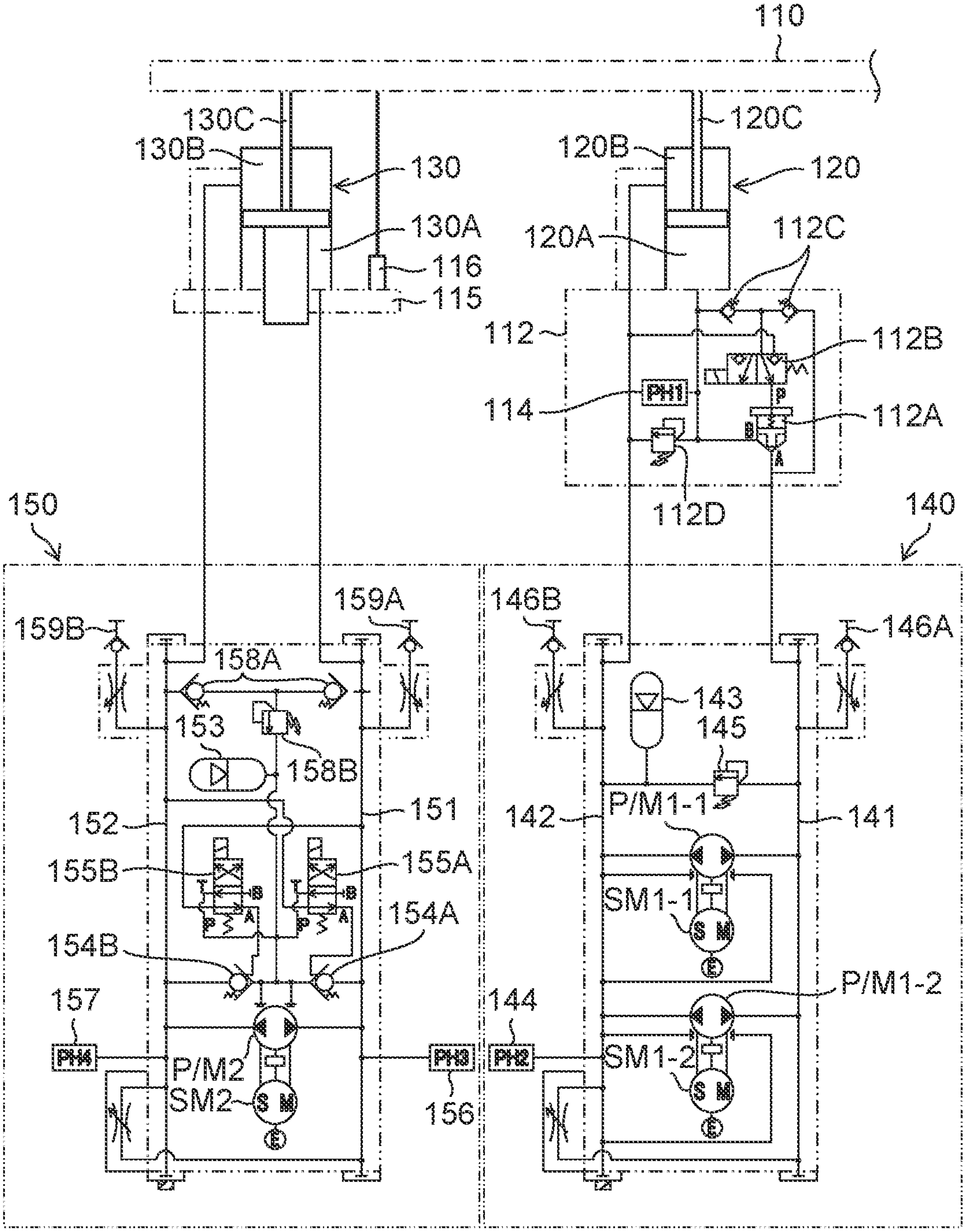
FIG. 2 is a diagram showing a first and a second hydraulic cylinders in the die cushion device shown in FIG. 1, and a first and a second hydraulic circuits for driving the first and the second hydraulic cylinders, according to a first embodiment.

FIG. 2 is a diagram showing the first and second hydraulic cylinders in the die cushion device shown in FIG. 1, and the first and second hydraulic circuits for driving the first and second hydraulic cylinders, according to a first embodiment.

A piston rod 120C of the first hydraulic cylinder 120 shown in FIG. 2 is connected to the lower surface of the cushion pad 110. A cushion-pressure-generating-side pressurizing chamber (hereinafter referred to as "lower chamber") 120A of the first hydraulic cylinder 120 is connected to the die cushion pressure generation line 141 of the first hydraulic circuit 140 via a hydraulic circuit 112 that supports the weight including the cushion pad 110 and so on, and a rod-side hydraulic chamber (hereinafter referred to as "upper chamber") 120B of the first hydraulic cylinder 120 is connected to the system pressure line 142 of the first hydraulic circuit 140 via the hydraulic circuit 112.

The hydraulic circuit 112 which supports the weight includes: a logic valve 112A; a solenoid valve 112B which switches the pilot pressure to the logic valve 112A; a pair of check valves 112C; a relief valve 112D; and a first pressure detector 114.

A pilot port of the logic valve 112A receives the pressure of the lower chamber 120A (or die cushion pressure generation line 141) of the first hydraulic cylinder 120 or the pressure of the upper chamber 120B (system pressure line 142) of the first hydraulic cylinder 120, depending on on/off of the solenoid valve 112B.

When the solenoid valve 112B is turned off in a case in which the press machine 10 (die cushion device 100) is not operated (in the case of state shown in FIG. 2), the pressure in the lower chamber 120A of the first hydraulic cylinder 120 (the pressure higher than the first system pressure by at least the pressure corresponding to the weight) is applied to the pilot port of the logic valve 112A so that the logic valve 112A closes. As a result, the hydraulic fluid (hydraulic oil) in the lower chamber 120A of the first hydraulic cylinder 120 does not flow out from the lower chamber 120A, so that the first hydraulic cylinder 120 can support the weight of the cushion pad 110 and so on.

On the other hand, when the solenoid valve 112B is turned on in a case in which the press machine 10 (die cushion device 100) is operated, the first system pressure is applied to the pilot port of the logic valve 112A. Since the first system pressure is lower than the pressure in the lower chamber 120A of the first hydraulic cylinder 120 or the die cushion pressure generation line 141, the logic valve 112A opens. As a result, the lower chamber 120A of the first hydraulic cylinder 120 is connected to the die cushion pressure generation line 141 via the logic valve 112A.

In addition, the first pressure detector 114 detects the pressure in the lower chamber 120A of the first hydraulic cylinder 120, and outputs a pressure signal indicating the detected pressure to the first controller 160.

Note that the hydraulic circuit 112 that supports the weight is not an essential component of the die cushion device according to the present invention, but a first pressure detector 114 that detects the pressure in the lower chamber 120A of the first hydraulic cylinder 120 is required.

In addition, as shown in FIG. 2, a die cushion position detector 116 which detects a position of the cushion pad 110 in the up-and-down direction (die cushion position) is provided between a fixing part 115, to which the first hydraulic cylinder 120 and the second hydraulic cylinder 130 are fixed, and the cushion pad 110. Here, the die cushion position detector may be built in the second hydraulic cylinder 130 and detect the position in the expansion/contraction direction of the piston rod 130C as the die cushion position, or the die cushion position detector may be provided between the bed 14 and the cushion pad 110.

<First Hydraulic Circuit>

The first hydraulic circuit 140 shown in FIG. 2 drives the first hydraulic cylinder 120 so that the cushion pad 110 generates a die cushion force, and includes: a plurality of (two in this example) first hydraulic pumps/motors (first hydraulic pumps/motors) (P/M1-1, and P/M1-2) connected between the die cushion pressure generation line 141 and the system pressure line 142; first servomotors (SM1-1, SM1-2) connected to the rotating shafts of the first hydraulic pumps/motors (P/M1-1, and P/M1-2), respectively; a first accumulator 143 connected to the system pressure line 142; and a first pressure detector 144 for detecting the first system pressure.

The first hydraulic circuit 140 is supplied with hydraulic oil from a lubrication device (not shown) through a coupler 146A having a check valve connected to the die cushion pressure generation line 141 and through a coupler 146B having a check valve connected to the system pressure line 142 so that hydraulic oil with the predetermined first system pressure is sealed in the first hydraulic circuit 140.

The hydraulic oil with the first system pressure is accumulated in the first accumulator 143 connected to the system pressure line 142. The first accumulator 143 has a predetermined gas pressure set therein and serves as a tank. Here, the first system pressure is preferably set to a pressure in the range of, for example, 0.1 MPa to 1.0 MPa.

When the hydraulic oil with the first system pressure is sealed in the first hydraulic circuit 140, the lubrication device is removed from the couplers 146A and 146B, and after that, the first hydraulic circuit 140 becomes a hydraulically closed circuit without hydraulic oil inflow and outflow from/to the outside.

The first system pressure is detected by the first pressure detector 144. As long as the first system pressure does not drop below the set lower limit, it is not necessary to supply hydraulic oil from the lubrication device to the first hydraulic circuit 140.

One port of each of the first hydraulic pumps/motors (P/M1-1, P/M1-2) is connected to the die cushion pressure generation line 141, and the other port of each of the first hydraulic pumps/motors (P/M1-1, P/M1-2) is connected to the system pressure line 142.

In addition, a relief valve 145 is arranged between the die cushion pressure generation line 141 and the system pressure line 142. The relief valve 145 operates when an abnormal pressure is generated (when the pressure cannot be controlled and a sudden abnormal pressure is generated), and is provided as a device which prevents damage to the hydraulic equipment.

Since the die cushion force applied from the first hydraulic cylinder 120 to the cushion pad 110 is expressed by the product of the pressure in the lower chamber 120A of the first hydraulic cylinder 120 and the cylinder cross-sectional area, controlling the die cushion force means controlling the pressure in the lower chamber 120A of the first hydraulic cylinder 120.

The pressure control of the lower chamber 120A of the first hydraulic cylinder 120 is performed by the first controller 160 controlling the first servomotors (SM1-1, SM1-2) that drive the first hydraulic pumps/motors (P/M1-1, P/M1-2). Note that pressure control by the first controller 160 will be described below in detail.

The piston rod 130C of the second hydraulic cylinder 130 shown in FIG. 2 is connected to the lower surface of the cushion pad 110.

The lower chamber 130A of the second hydraulic cylinder 130 is connected to the hydraulic line 151 of the second hydraulic circuit 150, and the upper chamber 130B of the second hydraulic cylinder 130 is connected to the hydraulic line 152 of the second hydraulic circuit 150.

The cross-sectional area of the upper chamber 130B of the second hydraulic cylinder 130 in this example is preferably larger than the cross-sectional area of the lower chamber 120A of the first hydraulic cylinder 120, and the cross-sectional area of the lower chamber 130A of the second hydraulic cylinder 130 is preferably smaller than the cross-sectional area of the upper chamber 130B of the second hydraulic cylinder 130.

If the cross-sectional area of the upper chamber 130B of the second hydraulic cylinder 130 is large, the pressure of the upper chamber 130B would be low even if the downward load (=reaction force of the upward load due to pre-pressurization) is large. When the pressure in the upper chamber 130B is low, the depressurization (pressure release) of the upper chamber 130B at the time of impact is faster. (Because the time required to reduce the pressure in the upper chamber 130B from the pressure corresponding to the reaction force to the system pressure is a negligible level.) As a result, a predetermined cushion force may be generated by the lower chamber 120A of the first hydraulic cylinder 120 immediately after the impact. In addition, reducing the cross-sectional area of the lower chamber 130A of the second hydraulic cylinder 130 may increase the upward moving speed of the piston rod 130C (cushion pad 110) with respect to the amount of hydraulic oil supplied to the lower chamber 130A of the second hydraulic cylinder 130.

<Second Hydraulic Circuit>

The second hydraulic circuit 150 shown in FIG. 2 drives the second hydraulic cylinder 130 so as to move the cushion pad 110 in the up-and-down direction and hold the cushion pad 110 in a desired position. The second hydraulic circuit 150 includes: a second hydraulic pump/motor (second hydraulic pump/motor) (P/M2) connected between hydraulic lines 151 and 152; a second servomotor (SM2) connected to the rotating shaft of the second hydraulic pump/motor (P/M2); a second accumulator 153 that accumulates the hydraulic oil with the second system pressure; a first pilot check valve 154A provided in the flow path between the lower chamber 130A of the second hydraulic cylinder 130 and the second accumulator 153; a second pilot check valve 154B provided in the flow path between the upper chamber 130B of the second hydraulic cylinder 130 and the second accumulator 153; solenoid valves 155A and 155B for applying pilot pressure to open the first pilot check valve 154A and the second pilot check valve 154B, respectively; a second pressure detector 156 that detects the pressure in the lower chamber 130A (hydraulic line 151) of the second hydraulic cylinder 130; and a third pressure detector 157 that detects the pressure in the upper chamber 130B (hydraulic line 152) of the second hydraulic cylinder 130.

In addition, a pair of check valves 158A are disposed between the hydraulic lines 151 and 152, and a relief valve 158B for preventing the generation of abnormal pressure is disposed between the check valves 158A and the second accumulator 153.

The second hydraulic circuit 150 is supplied with hydraulic oil from a lubrication device (not shown) through couplers 159A and 159B respectively having check valves connected to hydraulic lines 151 and 152 so that hydraulic oil with a predetermined second system pressure is sealed in the second hydraulic circuit 150.

The hydraulic oil with the second system pressure is accumulated in the second accumulator 153 connected to the hydraulic lines 151 and 152 via the first pilot check valve 154A and the second pilot check valve 154B, respectively. The second system pressure is preferably set to a pressure in the range of, for example, 0.1 MPa to 1.0 MPa, similarly to the first system pressure accumulated in the first accumulator 143 of the first hydraulic circuit 140.

The second hydraulic pump/motor (P/M2) discharges hydraulic oil from two ports, and one port of the second hydraulic pump/motor (P/M2) is connected to the hydraulic line 151 and the other port of the second hydraulic pump/motor (P/M2) is connected to the hydraulic line 152.

The solenoid valves 155A and 155B shown in FIG. 2 are all in the off states. When the cushion pad 110 is moved upward, the solenoid valve 155A is turned on and the solenoid valve 155B is turned off. Contrarily, when the cushion pad 110 is moved downward, the solenoid valve 155A is turned off and the solenoid valve 155B is turned on.

In addition, when the cushion pad 110 is moved upward, the second servomotor (SM2) drives the second hydraulic pump/motor (P/M2) so that pressure oil is supplied from one port of the second hydraulic pump/motor (P/M2) to the lower chamber 130A of the second hydraulic cylinder 130 via the hydraulic line 151, and when the cushion pad 110 is moved downward, the second servomotor (SM2) drives the second hydraulic pump/motor (P/M2) so that pressure oil is supplied from the other port of the second hydraulic pump/motor (P/M2) to the upper chamber 130B of the second hydraulic cylinder 130 via the hydraulic line 152.

When the cushion pad 110 is moved upward (when the lower chamber 130A of the second hydraulic cylinder 130 is pressurized), the second hydraulic pump/motor (P/M2) is driven so that pressure oil is supplied to the lower chamber 130A of the second hydraulic cylinder 130. In this case, the solenoid valve 155A is turned on, and the second system pressure accumulated in the second accumulator 153 is applied to the first pilot check valve 154A via the solenoid valve 155A. Therefore, the first pilot check valve 154A remains closed.

On the other hand, because the solenoid valve 155B is turned off and the pressure of the hydraulic line 151 (lower chamber 130A of the second hydraulic cylinder 130) is applied to the second pilot check valve 154B via the solenoid valve 155B, the second pilot check valve 154B is opened and the pressure in the upper chamber 130B of the second hydraulic cylinder 130 is reduced to the second system pressure.

Therefore, the hydraulic oil discharged from one port of the second hydraulic pump/motor (P/M2) is supplied to the lower chamber 130A of the second hydraulic cylinder 130 via the hydraulic line 151. In addition, the hydraulic oil discharged from the upper chamber 130B of the second hydraulic cylinder 130, as the piston rod 130C (cushion pad 110) of the second hydraulic cylinder 130 is moved upward, flows into the other port of the second hydraulic pump/motor (P/M2) and is accumulated in the second accumulator 153 via the second pilot check valve 154B.

When the cushion pad 110 is moved downward (when the upper chamber 130B of the second hydraulic cylinder 130 is pressurized), the second hydraulic pump/motor (P/M2) is driven so that the pressure oil is supplied to the upper chamber 130B of the second hydraulic cylinder 130. In this case, the solenoid valve 155B is turned on, and the second system pressure accumulated in the second accumulator 153 is applied to the second pilot check valve 154B via the solenoid valve 155B. Therefore, the second pilot check valve 154B remains closed.

On the other hand, because the solenoid valve 155A is turned off and the pressure of the hydraulic line 152 (upper chamber 130B of the second hydraulic cylinder 130) is applied to the first pilot check valve 154A via the solenoid valve 155A, the first pilot check valve 154A is opened and the pressure in the lower chamber 130A of the second hydraulic cylinder 130 is reduced to the second system pressure.

Therefore, the hydraulic oil discharged from the other port of the second hydraulic pump/motor (P/M2) is supplied to the upper chamber 130B of the second hydraulic cylinder 130 via the hydraulic line 152. In addition, the hydraulic oil discharged from the lower chamber 130A of the second hydraulic cylinder 130, as the piston rod 130C (cushion pad 110) of the second hydraulic cylinder 130 is moved downward, is sucked into one port of the second hydraulic pump/motor (P/M2). Note that, since the cross-sectional area of the upper chamber 130B of the second hydraulic cylinder 130 is larger than the cross-sectional area of the lower chamber 130A, a part of the hydraulic oil flowing into the second hydraulic pump/motor (P/M2) is supplied from the second accumulator 153 when the cushion pad 110 is moved downward.

In this way, the second hydraulic pump/motor (P/M2) may supply hydraulic oil to the lower chamber 130A of the second hydraulic cylinder 130 to move the cushion pad 110 upward, and may supply hydraulic oil to the upper chamber 130B of the second hydraulic cylinder 130 to move the cushion pad 110 downward.

<First Controller>

Next, operation of a first controller 160 that controls the first hydraulic circuit 140 that drives the first hydraulic cylinder 120 will be described.

Figure 3:
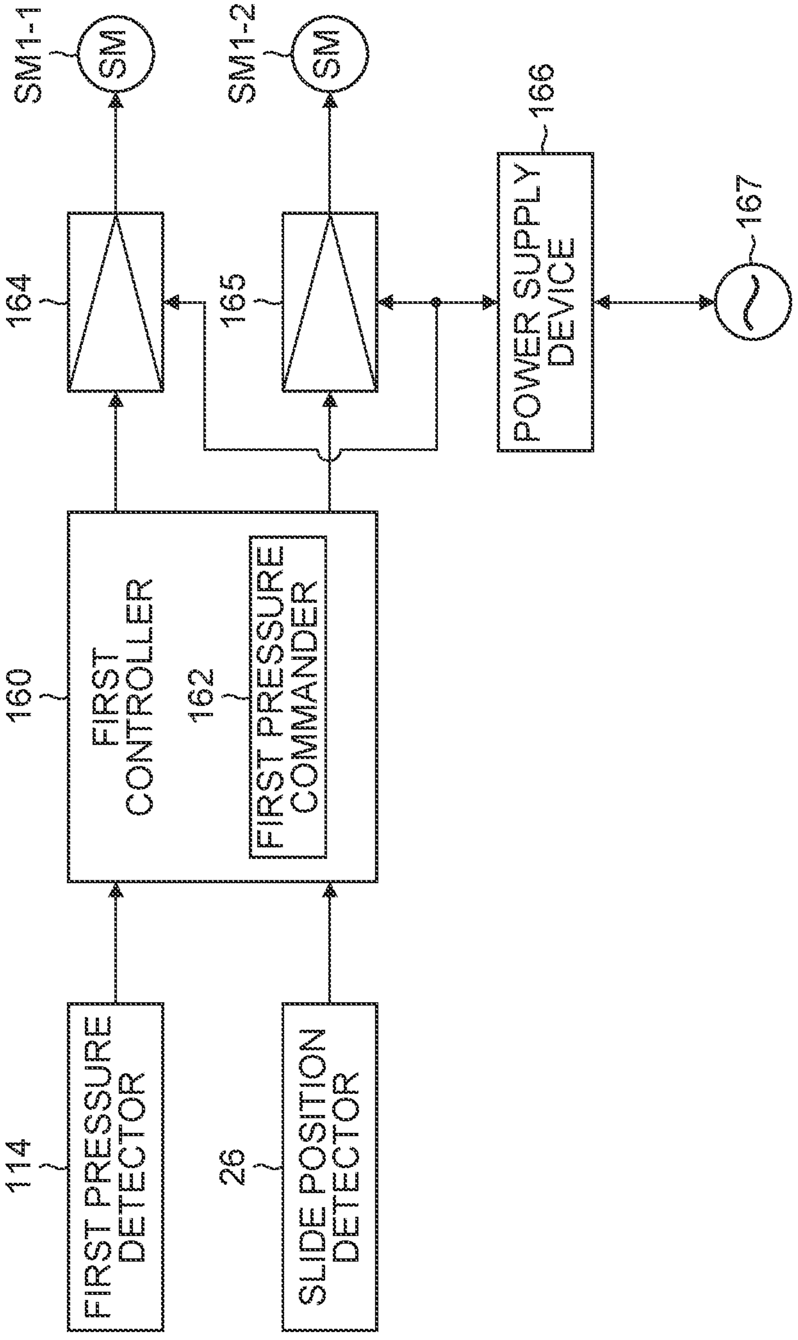
FIG. 3 is a block diagram showing a first controller according to the first embodiment.

FIG. 3 is a block diagram showing the first controller according to the first embodiment.

As shown in FIG. 3, the first controller 160 receives a pressure signal indicating the pressure of the lower chamber 120A of the first hydraulic cylinder 120 from the first pressure detector 114, and a slide position signal indicating the position of the slide 20 from the slide position detector 26.

The first controller 160 includes a first pressure commander 162. The first pressure commander 162 receives a slide position signal detected by the slide position detector 26 in order to output a pressure command (including a die cushion pressure command) corresponding to the position of the slide 20.

The first pressure commander 162 outputs: a first pressure command for indicating the die cushion pressure corresponding to the die cushion force during press forming; a second pressure command for pre-pressurizing the lower chamber 120A of the first hydraulic cylinder 120 to be a preset pressure before press forming (when the cushion pad 110 is in the die cushion standby position); and the like. In addition, the first pressure commander 162 also controls output timings of the first pressure command, the second pressure command, and the like based on the slide position signal.

Note that, in this example, the first pressure commander 162 outputs a stepped first pressure command (first pressure command having a stepped shape) and also outputs a second pressure command for pre-pressurization that indicates the same pressure as the first pressure command for a certain period before impact, as will be described below. Therefore, there is no change in the pressure command between the first pressure command and the second pressure command.

Furthermore, the first pressure commander 162 outputs the first pressure command, the second pressure command, and the like based on the slide position signal, but is not limited to this. The first pressure commander 162 may output the first pressure command, the second pressure command, and the like based on a crank angle signal detected by the crankshaft encoder 28. This is because the slide position is converted from the crank angle.

The first controller 160 calculates a torque command for driving the first servomotors (SM1-1, SM1-2) in order to control the pressure of the lower chamber 120A of the first hydraulic cylinder 120 according to the pressure command based on the pressure command (first and second pressure commands) output from the first pressure commander 162 and the pressure signal indicating the pressure of the lower chamber 120A of the first hydraulic cylinder 120 detected by the first pressure detector 114. In calculating the torque command, it is preferable to use the angular velocity of the drive shaft of the first servomotor (SM1-1, SM1-2) as the angular velocity feedback signal for gaining sufficient dynamic stability.

The first controller 160 outputs a torque command calculated using a pressure command, a pressure signal, and the like to the first servomotors (SM1-1, SM1-2) via the amplifier/PWM controllers (amplifier-cum-PWM controllers) (PWM: Pulse Width Modulation) 164 and 165 to control the pressure in the lower chamber 120A of the first hydraulic cylinder 120.

Here, the torque output direction of the first servomotors (SM1-1, SM1-2) at the time of pressure control in pre-pressurizing the lower chamber 120A of the first hydraulic cylinder 120 is opposite to the torque output direction of the first servomotors (SM1-1, SM1-2) when the slide 20 is moved downward from the time of the impact against the cushion pad 110 to the time when the slide 20 reaches the bottom dead center (when press forming). The impact here means that the upper die 30 mounted on the slide 20 collides with the cushion pad 110 supported by the first hydraulic cylinder 120 via the blank, the blank holder 102 and the cushion pin 104.

That is, the pressure oil discharged from the lower chamber 120A of the first hydraulic cylinder 120 flows into the first hydraulic pumps/motors (P/M1-1, P/M1-2) by the power that the cushion pad 110 receives from the slide 20, so that the first hydraulic pumps/motors (P/M1-1, P/M1-2) act as hydraulic motors. The first servomotors (SM1-1, SM1-2) are driven by the first hydraulic pumps/motors (P/M1-1, P/M1-2) to act as generators.

In other words, the force transmitted from the slide 20 to the first hydraulic cylinder 120 via the cushion pad 110 compresses the lower chamber 120A of the first hydraulic cylinder 120 and generates a die cushion pressure. At the same time, when the die cushion pressure causes the first hydraulic pumps/motors (P/M1-1, P/M1-2) to act as hydraulic motors and the rotating shaft torque generated in the first hydraulic pumps/motors (P/M1-1, P/M1-2) resists the drive torque of the first servomotors (SM1-1, SM1-2), the first servomotors (SM1-1, SM1-2) are rotated to control the die cushion pressure. After all, the die cushion pressure is controlled in response to the drive torque of the first servomotors (SM1-1, SM1-2).

The power generated by the first servomotors (SM1-1, SM1-2) during the generation of die cushion pressure is regenerated to the AC power supply 167, via the amplifier/PWM controllers 164 and 165 and the DC power supply device 166 having a power regeneration function.

In addition, when the slide 20 reaches the bottom dead center, the first controller 160 performs: pressure control for depressurizing the lower chamber 120A of the first hydraulic cylinder 120 so as to change the pressure to the first system pressure; pressure control for the product knockout force required when the second hydraulic cylinder 130 is moved upward to knock out the product after locking ends; and pressure control for the weight of the cushion pad 110, and so on during the standby period (excluding the pre-pressurizing period) at the die cushion standby position of the cushion pad 110.

<Second Controller>

Next, operation of the second controller 170 that controls the second hydraulic circuit 150 that drives the second hydraulic cylinder 130 will be described.

Figure 4:
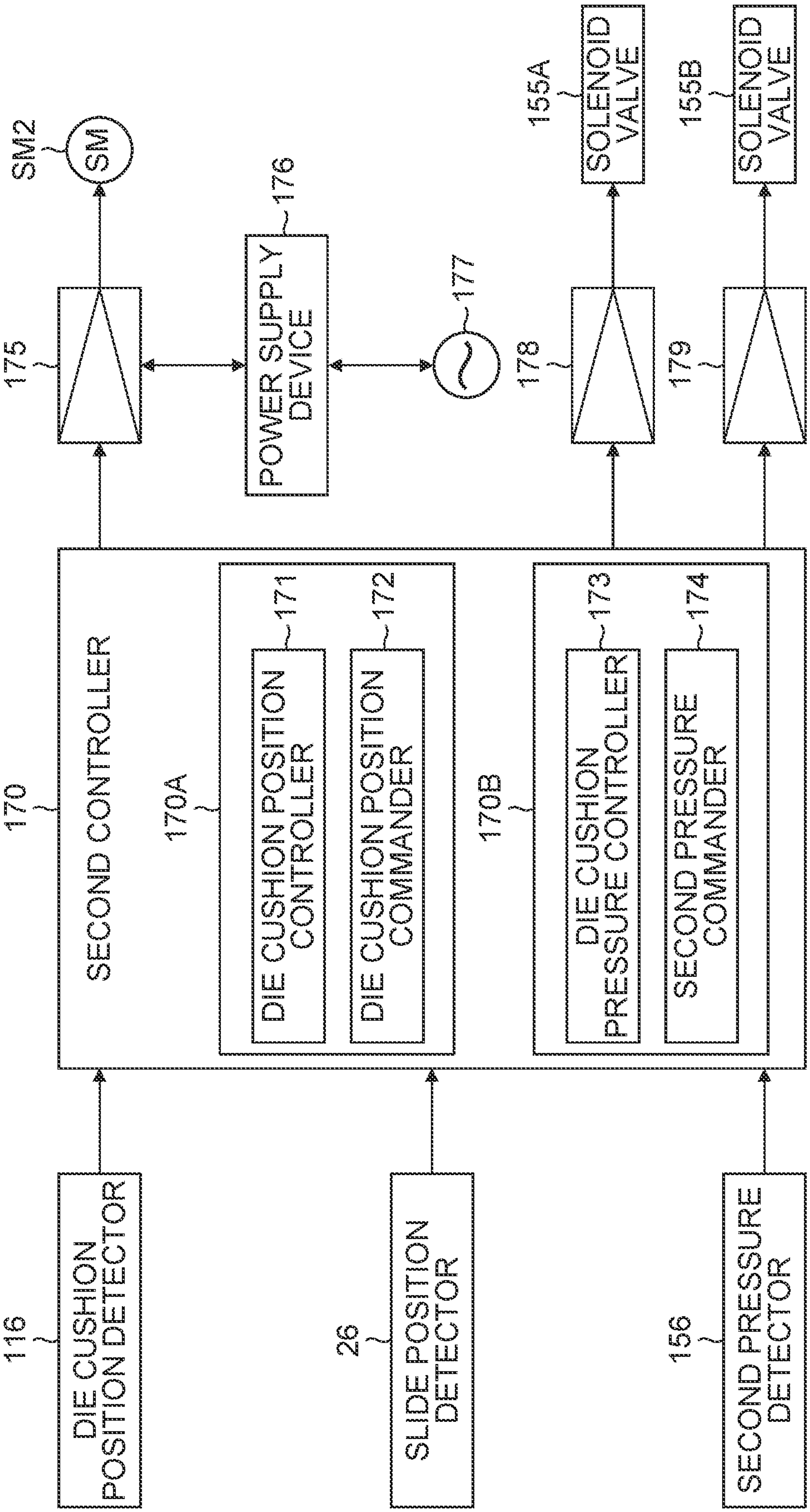
FIG. 4 is a block diagram showing a second controller according to the first embodiment.

FIG. 4 is a block diagram showing the second controller according to the embodiment.

As shown in FIG. 4, the second controller 170 receives: the die cushion position signal indicating the position of the cushion pad 110 (die cushion position) from the die cushion position detector 116; the slide position signal indicating the position of the slide 20 from the slide position detector 26; and the pressure signal indicating the pressure of the lower chamber 130A of the second hydraulic cylinder 130 from the second pressure detector 156.

The second controller 170 of this example includes a die cushion position control unit 170A and a die cushion pressure control unit 170B.

The die cushion position control unit 170A includes a die cushion position controller 171 and a die cushion position commander 172. The die cushion position commander 172 receives the slide position signal from the slide position detector 26, and the die cushion position commander 172 outputs a die cushion position command for controlling the position of the cushion pad 110 in a period other than the press forming period based on the slide position signal.

In this example, the die cushion position commander 172 outputs: a first die cushion position command for causing the cushion pad 110 to stand by at the die cushion standby position before press forming; a second die cushion position command for accelerating (pre-accelerating) the cushion pad 110 in the period from when the first die cushion position command is output to when the cushion pad 110 reaches the impact position from the die cushion standby position; a fourth die cushion position command for holding the cushion pad 110 at a position corresponding to the bottom dead center of the slide 20; a fifth die cushion position command for moving the cushion pad 110 to the die cushion standby position after the output of the fourth die cushion position command for a certain period of time; and the like.

When the second hydraulic cylinder 130 is in the position control state, the die cushion position controller 171 calculates a torque command for controlling the second servomotor (SM2) to move or hold the position of the cushion pad 110 according to the die cushion position command, based on the die cushion position command output from the die cushion position commander 172 and the die cushion position signal detected by the die cushion position detector 116. In calculating the torque command, it is preferable to use the angular velocity of the drive shaft of the second servomotor (SM2) as the angular velocity feedback signal for gaining sufficient dynamic stability.

Then, when the second hydraulic cylinder 130 is in the position control state, the die cushion position controller 171 of the second controller 170 outputs the torque command calculated using the die cushion position command, the die cushion position signal and the like, to the second servomotor (SM2) via the amplifier/PWM controller 175 to move the piston rod 130C (cushion pad 110) of the second hydraulic cylinder 130 in the up-and-down direction, or to hold the cushion pad 110 at a desired position.

Note that the die cushion position controller 171 outputs a drive signal for turning on the solenoid valve 155A to the solenoid valve 155A via the amplifier 178 in a case where the die cushion position controller 171 outputs the torque command to supply the hydraulic oil to the lower chamber 130A of the second hydraulic cylinder 130. Therefore, it is possible to supply the hydraulic oil to the lower chamber 130A of the second hydraulic cylinder 130 and discharge the hydraulic oil from the upper chamber 130B of the second hydraulic cylinder 130. The die cushion position controller 171 outputs the drive signal for turning on the solenoid valve 155B to the solenoid valve 155B via the amplifier 179 in a case where the die cushion position controller 171 outputs the torque command to supply hydraulic oil to the upper chamber 130B of the second hydraulic cylinder 130. Therefore, it is possible to supply the hydraulic oil to the upper chamber 130B of the second hydraulic cylinder 130 and discharge the hydraulic oil from the lower chamber 130A of the second hydraulic cylinder 130.

On the other hand, the die cushion pressure control unit 170B includes a die cushion pressure controller 173 and a second pressure commander 174. The second pressure commander 174 receives the slide position signal from the slide position detector 26, and the second pressure commander 174 outputs a die cushion pressure command (third pressure command) for controlling the pressure of the second hydraulic cylinder 130 during the press forming period based on the received slide position signal.

In this example, the second pressure commander 174 outputs a pressure command corresponding to an auxiliary die cushion force that assists the die cushion force (main die cushion force) generated by the first hydraulic cylinder 120 during press forming, or outputs a pressure command for making the die cushion force generated by the second hydraulic cylinder 130 zero.

When the second hydraulic cylinder 130 is in the pressure control state, the die cushion pressure controller 173 calculates the torque command for driving the second servomotor (SM2) in order to control the pressure in the lower chamber 130A of the second hydraulic cylinder 130 according to the pressure command, based on the die cushion pressure command output from the second pressure commander 174 and the pressure signal output from the second pressure detector 156. In calculating the torque command, it is preferable to use the angular velocity of the drive shaft of the second servomotor (SM2) as the angular velocity feedback signal for gaining sufficient dynamic stability.

Then, when the second hydraulic cylinder 130 is in the pressure control state, the die cushion pressure controller 173 of the second controller 170 outputs the torque command calculated using the pressure command, the pressure signal, and the like to the second servomotor (SM2) via the amplifier/PWM controller 175, to control the pressure in the lower chamber 130A of the second hydraulic cylinder 130 to be the pressure corresponding to the auxiliary die cushion force or to control the pressure for making the die cushion force generated by the second hydraulic cylinder 130 zero.

Note that the die cushion pressure controller 173 outputs the drive signal for turning on the solenoid valve 155A to the solenoid valve 155A via the amplifier 178 in a case where the die cushion pressure controller 173 outputs the torque command to supply hydraulic oil to the lower chamber 130A of the second hydraulic cylinder 130. Therefore, it is possible to pressurizing the lower chamber 130A of the second hydraulic cylinder 130 and sets the upper chamber 130B to the second system pressure.

Alternatively, when the second hydraulic cylinder 130 is controlled to generate the auxiliary die cushion force, the second servomotor (SM2) acts as a generator and the power generated by the second servomotor (SM2) is regenerated to the AC power supply 177 via the amplifier/PWM controller 175 and the DC power supply device 176 having a power regeneration function.

On the other hand, when pressure control is performed on the second hydraulic cylinder 130 so that the die cushion force generated by the second hydraulic cylinder 130 becomes zero, the second hydraulic cylinder 130 does not interfere with the die cushion force generated by the first hydraulic cylinder 120.

The position control of the second hydraulic cylinder 130 by the die cushion position control unit 170A and the pressure control of the second hydraulic cylinder 130 by the die cushion pressure control unit 170B may be switched according to the position of the slide 20 and the crank angle detected by the crankshaft encoder 28.

Further, the second controller 170 may be configured so as to only perform a position control of the second hydraulic cylinder 130. In this case, the die cushion pressure control unit 170B is unnecessary in the second controller 170.

During press forming, it is preferable that the die cushion position commander 172 of the die cushion position control unit 170A output the die cushion position command (third die cushion position command) corresponding to the position of the slide 20 and that the die cushion position controller 171 perform position control of the second hydraulic cylinder 130 based on the third die cushion position command and the die cushion position signal. Thereby, position control may be performed on the second hydraulic cylinder 130 so as not to interfere with the die cushion force generated by the first hydraulic cylinder 120.

According to the first embodiment, in a case where the cushion pad 110 is pre-pressurized at the die cushion standby position, pressure control is performed on the first hydraulic cylinder 120 so as to apply a desired pressure to the lower chamber 120A of the first hydraulic cylinder 120. At the same time, position control is performed on the second hydraulic cylinder 130 so as to hold the cushion pad 110 at the die cushion standby position. Therefore, it is possible to hold the cushion pad 110 accurately at the die cushion standby position while the pre-pressurization is performed on the cushion pad 110.

In addition, because the cushion pad 110 is positioned accurately at the die cushion standby position, it is possible to suppress the upper surface of the blank holder 102 from being positioned higher than the upper surface of the lower die 34 so as to prevent deflection of the mounted blank (material) by the blank holder 102, which may properly maintain processing accuracy.

Further, because the upward movement of the blank holder 102 is suppressed, it is unnecessary to correct conveyance line of a conveyor when a blank (material) is supplied from outside of the press machine.

Still further, because the pre-pressurization of the cushion pad 110 and the die cushion standby position are stable at each cycle of the press machine, stability of the product quality may be maintained.

Moreover, because the pressure in the upper chamber 120B of the first hydraulic cylinder 120 can be maintained at the predetermined first system pressure, the first hydraulic cylinder 120 may generate the target die cushion force immediately after impact.

Note that, in the first embodiment described above, in a case where pressure control is performed on the first hydraulic cylinder 120 and the second hydraulic cylinder 130, for simplicity of explanation, the pressure in the upper chamber 120B of first hydraulic cylinder 120 (first system pressure) and the pressure in the upper chamber 130B of the second hydraulic cylinder 130 (second system pressure) are not taken into consideration. However, in order to more accurately control the die cushion force generated by the cushion pad 110, it is desirable to consider the pressure in the upper chamber 120B of the first hydraulic cylinder 120 and the like.

<First Control Method of Die Cushion Device>

Next, a first control method of the die cushion device will be described.

Figure 5:
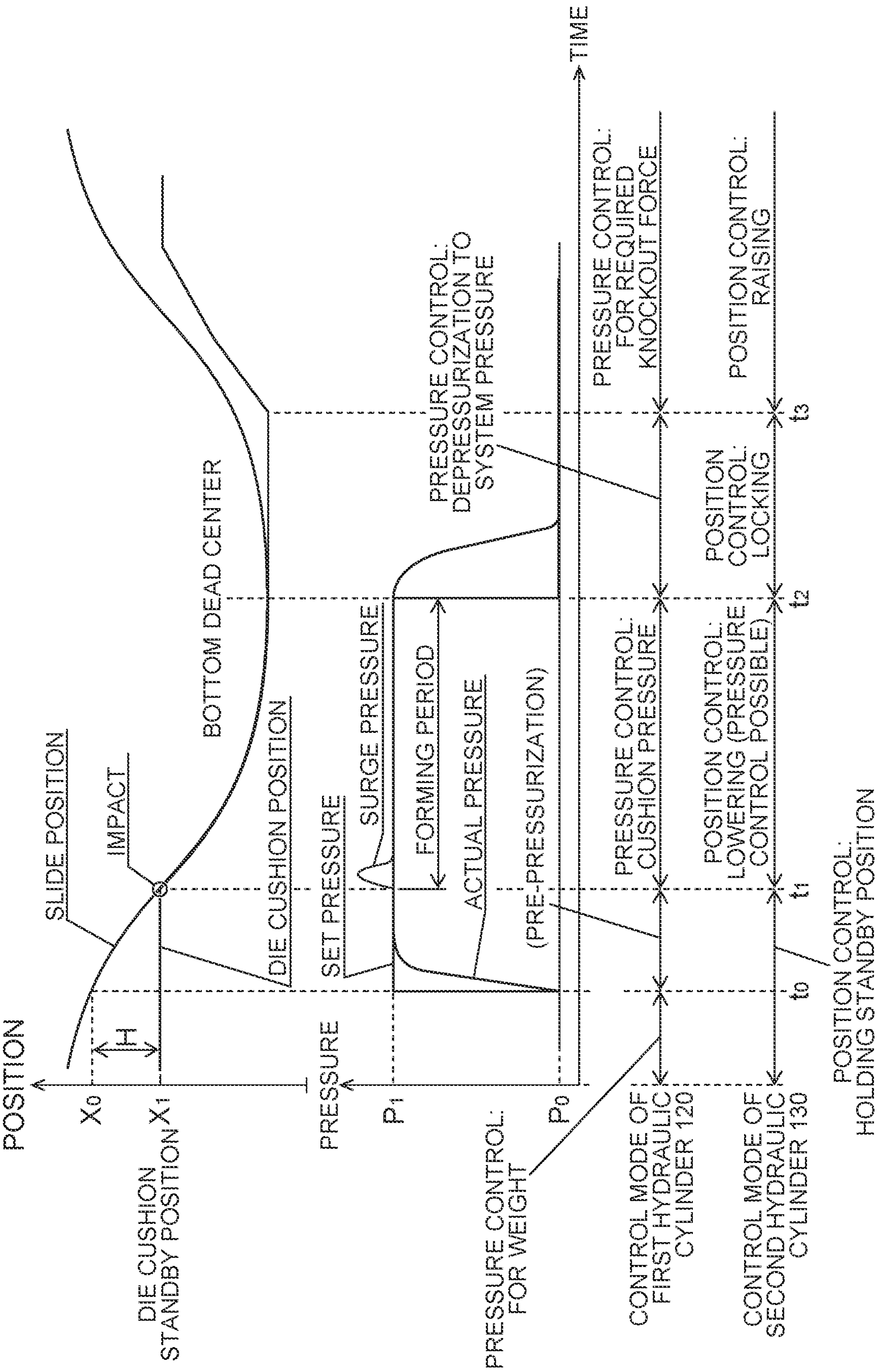
FIG. 5 is a waveform diagram showing a slide position, a die cushion position, pressure commands (set pressures), and an actual pressure in one press cycle in a case where the die cushion device is controlled by a first control method.

FIG. 5 is a waveform diagram showing a slide position, a die cushion position, pressure commands (set pressures), and an actual pressure in one press cycle in a case where the die cushion device is controlled by the first control method.

The first control method of the die cushion device 100 particularly has a feature that the pressure of the lower chamber 120A of the first hydraulic cylinder 120 is pre-pressurized to have a preset pressure before press forming.

Before press forming, since the pressing force from the slide 20 of the press machine 10 is not applied to the cushion pad 110, in a case where pressure oil is simply supplied to the lower chamber 120A to pre-pressurize the lower chamber 120A of the first hydraulic cylinder 120, the piston rod 120C (cushion pad 110) of the first hydraulic cylinder 120 is moved upward so that the lower chamber 120A of the first hydraulic cylinder 120 cannot be pre-pressurized.

Then, in the present invention, the die cushion pressure control and die cushion position control are simultaneously performed, so that pressure control is performed on the first hydraulic cylinder 120 for pre-pressurization while position control is performed on the second hydraulic cylinder 130 so as not to move the cushion pad 110 from the die cushion standby position.

Figure 6:
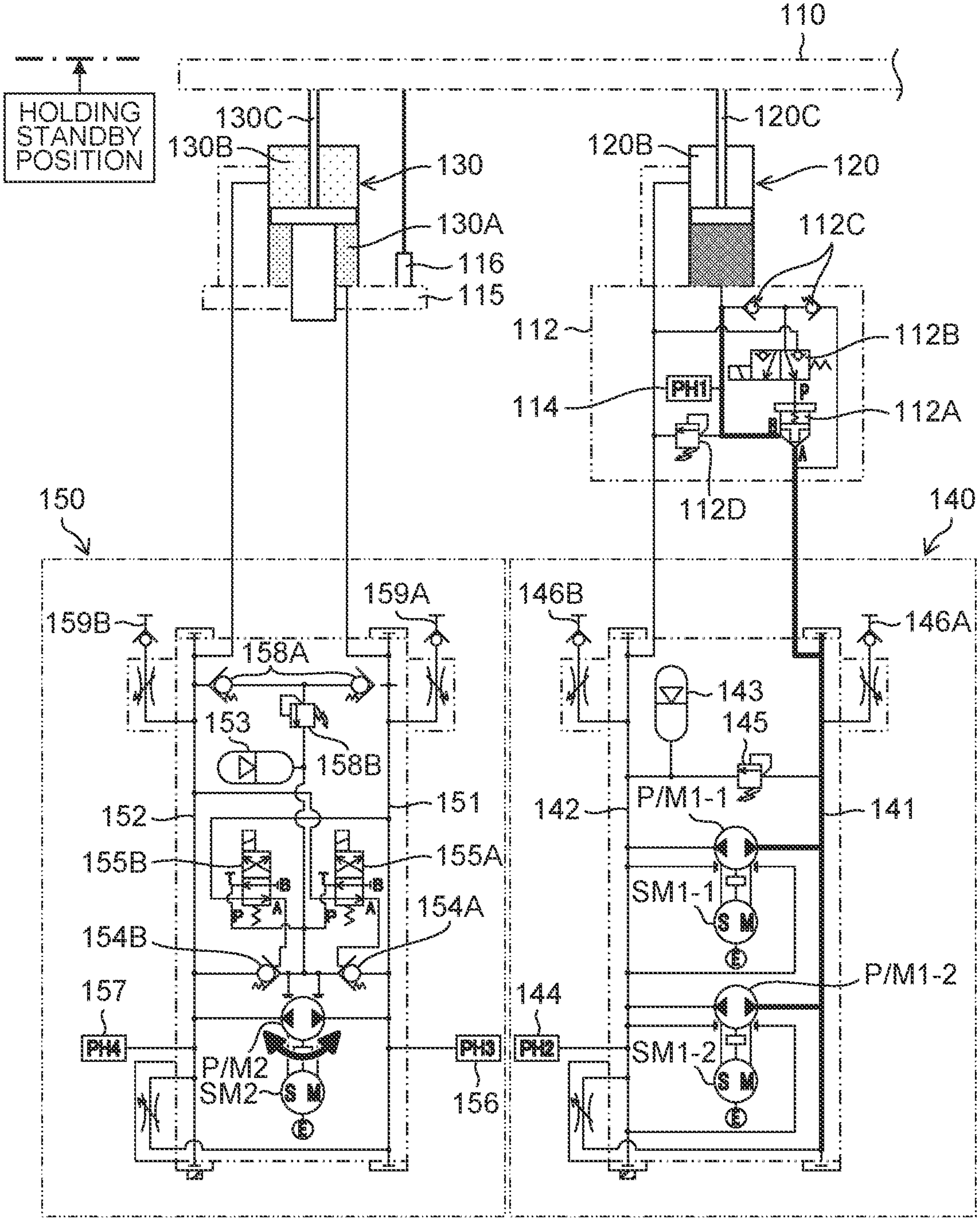
FIG. 6 is a diagram showing a drive part of the die cushion device similar to FIG. 2 and is a diagram mainly showing operation states of the first and second hydraulic cylinders and so on in a state in which a cushion pad is held in a die cushion standby position before pre-pressurization.

FIG. 6 is a diagram showing a drive part of the die cushion device similar to FIG. 2. FIG. 6 mainly shows operation states of the first and second hydraulic cylinders and the like in a case where the cushion pad is held in the die cushion standby position before pre-pressurization, and shows the state before a time $t_0$ when the pre-pressurization is started in the one cycle waveform diagram shown in FIG. 5.

In this case, the second controller 170 performs position control on the second hydraulic cylinder 130 by the die cushion position command (first die cushion position command) in order to position the cushion pad 110 at the die cushion standby position $X_1$. In order to hold the cushion pad 110 at the die cushion standby position $X_1$ as per the first die cushion position command, the second controller 170 rotates the second servomotor (SM2) in one direction (first direction) or the other direction (second direction) to adjust the pressure applied to the lower chamber 130A of the second hydraulic cylinder 130 and the pressure applied to the upper chamber 130B the second hydraulic cylinder 130, from the second hydraulic pump/motor (P/M2) driven by the second servomotor (SM2). In a case where the first hydraulic cylinder 120 supports the load for the weight of the cushion pad 110 and so on in the state in which the cushion pad 110 is held at the die cushion standby position $X_1$, a product of the cross-sectional area and the pressure in the lower chamber 130A of the second hydraulic cylinder 130 is almost the same as a product of the cross-sectional area and the pressure in the upper chamber 130B.

On the other hand, in the state in which the second controller 170 performs position control on the second hydraulic cylinder 130, the first controller 160 performs pressure control on the first hydraulic cylinder 120 so that the first hydraulic cylinder 120 accessorily (auxiliary) supports the load for the weight of the cushion pad 110 and so on. In other words, the first controller 160 controls the first servomotors (SM1-1, SM1-2) to apply a pressure $P_0$ from the first hydraulic pumps/motors (P/M1-1, P/M1-2) to the lower chamber 120A of the first hydraulic cylinder 120 in order to support the load for the weight of the cushion pad 110 and so on.

After that, when the slide 20 moves downward and the slide position reaches the position $X_0$ (time $t_0$ in FIG. 5) that is higher than the die cushion standby position $X_1$ by height H, the first controller 160 starts pre-pressurization in order to pressurize the lower chamber 120A of the first hydraulic cylinder 120 to the set pressure $P_1$.

Figure 7:
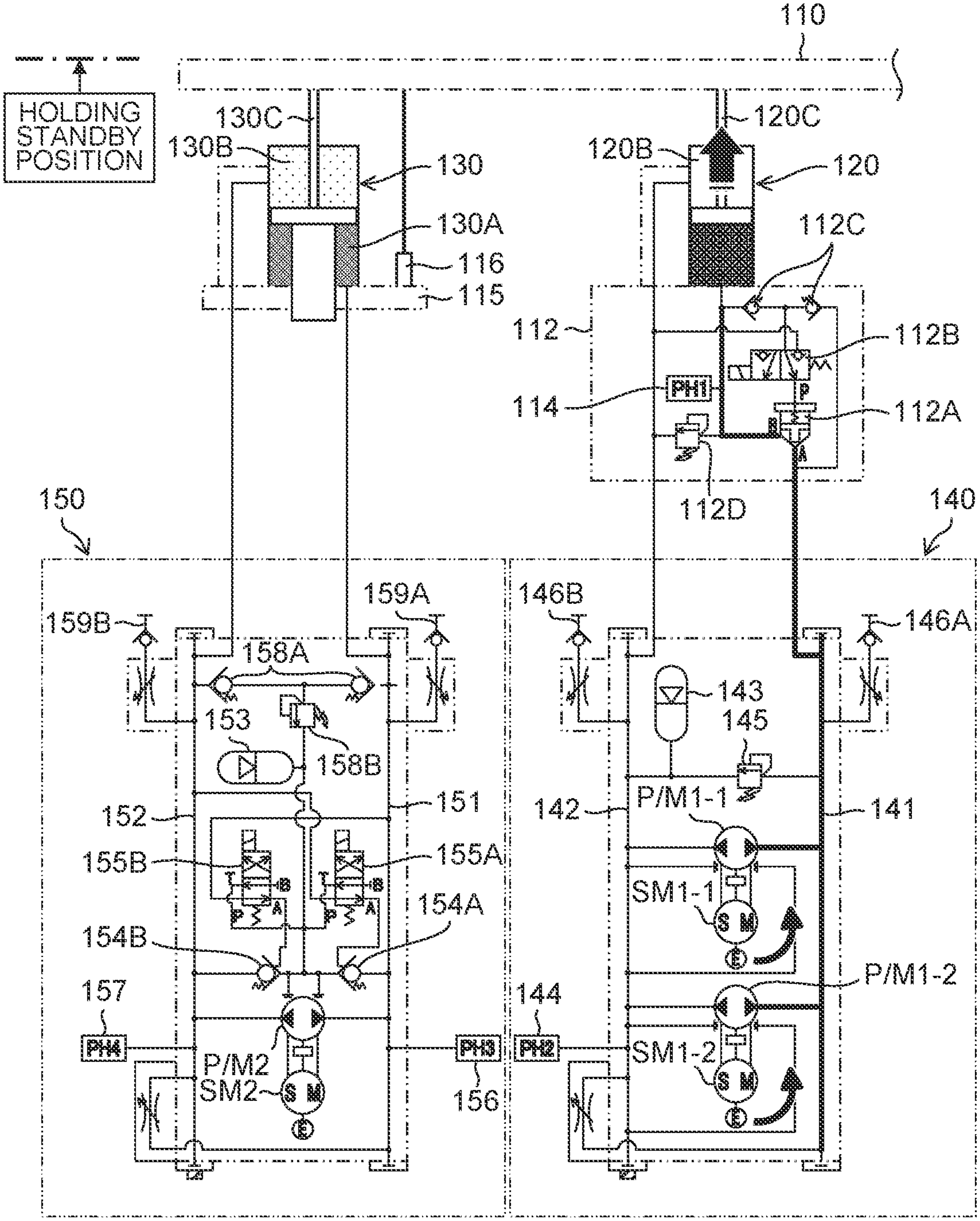
FIG. 7 is a diagram showing the drive part of the die cushion device similar to that of FIG. 2 and is a diagram mainly showing an initial operation state of the first and second hydraulic cylinders and so on in pre-pressurization control in a state in which the cushion pad is held in the die cushion standby position.

FIG. 7 is a diagram showing a drive part of the die cushion device similar to that of FIG. 2, and mainly shows the initial operation states of the first and second hydraulic cylinders and the like, during pre-pressurization control in a state in which the cushion pad is held in the die cushion standby position.

In this case, the first controller 160 drives a first hydraulic pumps/motors (P/M1-1, P/M1-2) via a first servomotor (SM1-1, SM1-2) based on the second pressure command and the like for pre-pressurizing to the preset pressure $P_1$, and supplies pressure oil from the first hydraulic pumps/motors (P/M1-1, P/M1-2) to the lower chamber 120A of the first hydraulic cylinder 120 to perform pressure control so that the lower chamber 120A of the first hydraulic cylinder 120 has the set pressure $P_1$.

When the lower chamber 120A of the first hydraulic cylinder 120 is pressurized, the first hydraulic cylinder 120 applies a force for moving the cushion pad 110 upward, as shown by an arrow in FIG. 7.

Then, when the cushion pad 110 is urged to move upward by the pre-pressurization control, the second controller 170 performs position control on the second hydraulic cylinder 130 so as to hold the cushion pad 110 at the die cushion standby position (so as not to move upward).

Figure 8:
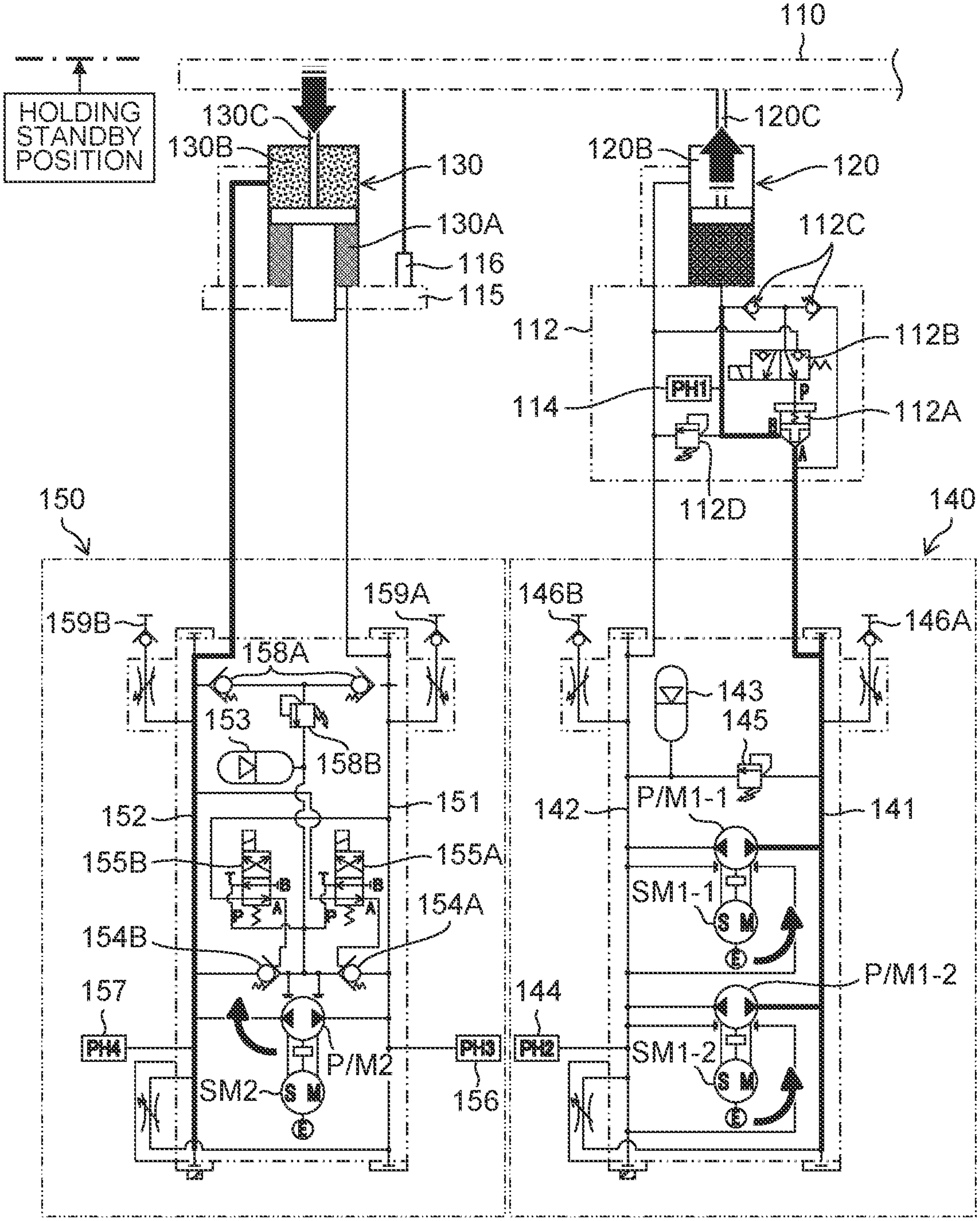
FIG. 8 is a diagram showing the drive part of the die cushion device similar to FIG. 2 and is a diagram mainly showing an operation state of the first and second hydraulic cylinders and so on in a state in which the cushion pad is held in the die cushion standby position and the pre-pressurization is completed.

FIG. 8 is a diagram showing the drive part of the die cushion device similar to that of FIG. 2, and mainly shows the operation states of the first and second hydraulic cylinders and the like in a state in which the cushion pad is held at the die cushion standby position and the pre-pressurization is completed.

In this case, because the cushion pad 110 is held at the die cushion standby position, and the hydraulic oil in the lower chamber 120A of the first hydraulic cylinder 120 is in a state of being pressurized (compressed) to the set pressure $P_1$, there is no inflow of hydraulic oil from the first hydraulic pumps/motor (P/M1-1, P/M1-2) into the lower chamber 120A of the first hydraulic cylinder 120. However, in order to hold the pressure in the lower chamber 120A of the first hydraulic cylinder 120 at the set pressure $P_1$, the first controller 160 continues to drive the first servomotors (SM1-1, SM1-2), as in the case of FIG. 7, to perform pressure control so that one port side of the first hydraulic pumps/motors (P/M1-1, P/M1-2) has the set pressure $P_1$.

On the other hand, the second controller 170 performs position control on the second hydraulic cylinder 130 so as to hold the cushion pad 110 at the die cushion standby position. As a result, the second hydraulic cylinder 130 applies to the cushion pad 110, a force for offsetting the upward pushing force (downward pushing force) applied to the cushion pad 110 from the first hydraulic cylinder 120.

Here, the upward pushing force $F_1$ applied from the first hydraulic cylinder 120 to the cushion pad 110 is expressed by the following expression.

$$F_1 = \text{pressure (set pressure } P_1\text{) in the lower chamber } 120A \text{ of the first hydraulic cylinder } 120 \times \text{cross-sectional area} \qquad \text{[Expression 1]}$$

The downward pushing force $F_2$ applied from the second hydraulic cylinder 130 to the cushion pad 110 may be expressed by the following expression.

$$F_2 = \text{pressure in the upper chamber } 130B \text{ of the second hydraulic cylinder } 130 \times \text{cross-sectional area} \qquad \text{[Expression 2]}$$

Therefore, in a case where the cushion pad 110 is held at the die cushion standby position and the pre-pressurization is completed, $F_1$=F2.

Furthermore, in the [Expression 1], the first system pressure in the upper chamber 120B of the first hydraulic cylinder 120 is not taken into consideration, and in the [Expression 2], the second system pressure in the lower chamber 130A of the second hydraulic cylinder 130 is not taken into consideration. However, when the first system pressure and the second system pressure are substantially the same, and the cross-sectional area of the upper chamber 120B of the first hydraulic cylinder 120 and the cross-sectional area of the lower chamber 130A of the second hydraulic cylinder 130 are substantially the same, the forces generated by the first system pressure and the second system pressure substantially offset each other. Therefore, the upward pushing force $F_1$ to the cushion pad 110 is substantially equal to the downward pushing force $F_2$ to the cushion pad 110.

As shown in FIG. 5, the pre-pressurization only needs to be completed by the time when the slide position reaches the die cushion standby position $X_1$ (time $t_1$).

The first controller 160 performs pressure control on the first hydraulic cylinder 120 so that the pressure in the lower chamber 120A of the first hydraulic cylinder 120 is held at the set pressure $P_1$ also after the slide position reaches the die cushion standby position $X_1$ (after impact). In this example, the second pressure command for pre-pressurizing the lower chamber 120A of the first hydraulic cylinder 120 to the preset pressure $P_1$ before press forming is the same pressure command as the first pressure command indicating the die cushion pressure $P_1$ corresponding to die cushion force during press forming. Therefore, the first controller 160 performs pressure control on the first hydraulic cylinder 120 based on the same pressure command in the period from the time $t_0$ to time $t_1$ and the period (press forming period) from the time $t_1$ to time $t_2$ (when the slide position reaches bottom dead center).

On the other hand, when the slide position reaches the die cushion standby position $X_1$ (time $t_1$), the second controller 170 performs position control on the second hydraulic cylinder 130 based on the die cushion position command (third die cushion position command) corresponding to the slide position. Therefore, it is possible to prevent the second controller 170 from interfering with the die cushion force generated by the first hydraulic cylinder 120.

Furthermore, when the slide position reaches the die cushion standby position $X_1$, the second controller 170 may switch to pressure control based on the third pressure command, from the position control on the second hydraulic cylinder 130. The third pressure command is a pressure command corresponding to the auxiliary die cushion force that assists the die cushion force (main die cushion force) generated by the first hydraulic cylinder 120 during press forming, or a pressure command for making the die cushion force generated by the second hydraulic cylinder 130 zero.

Next, when the slide position reaches the bottom dead center, the first controller 160 performs pressure control for depressurizing the lower chamber 120A of the first hydraulic cylinder 120 for a certain period from the time $t_2$ when the slide position reaches bottom dead center to the time (product knockout start time) $t_3$ when the product knockout starts (i.e., locking period for holding the cushion pad 110 at the position corresponding to the bottom dead center), so as to change the pressure in the lower chamber 120A of the first hydraulic cylinder 120 to the first system pressure. After locking is completed, the first controller 160 performs pressure control required for product knockout.

On the other hand, when the slide position reaches bottom dead center, the second controller 170 performs position control (locking control) for holding the cushion pad 110 at the position corresponding to the bottom dead center for a certain period of time from the time $t_2$ when the slide position reaches the bottom dead center to the time $t_3$ (locking period) based on the fourth die cushion position command. Subsequently, the second controller 170 performs position control for moving the cushion pad 110 upward to position the cushion pad 110 at the die cushion standby position again based on the fifth die cushion position command.

According to the first control method of the die cushion device, since the pressure of the lower chamber 120A of the first hydraulic cylinder 120 is pre-pressurized so as to reach the set pressure $P_1$ before press forming, and the force applied to the cushion pad 110 from the second hydraulic cylinder 130 may be reduced to zero immediately after impact. Therefore, press forming may be started with the die cushion force required for molding (set pressure $P_1$ corresponding to the die cushion force) from the moment of impact.

In addition, pre-pressurizing before press forming may reduce the surge pressure at the time of impact as compared with the case in which pre-pressurizing is not performed.

Furthermore, since the cushion pad 110 is held in the die cushion standby position by the second hydraulic cylinder 130 before press forming, the cushion pad 110 would not be pushed up even in a case where the impact position is wrong. In addition, since position control and pressure control are separated, even in a case where switching (such as switching after impact) is roughly performed from position control for holding the cushion pad 110 at the die cushion standby position to pressure control (or other position control), there is no trouble.

In addition, because the die cushion standby position may be freely set, a greater variety of dies may be supported by cushion pins having the same length.

<Second Control Method of Die Cushion Device>

Next, a second control method of the die cushion device will be described.

Figure 9:
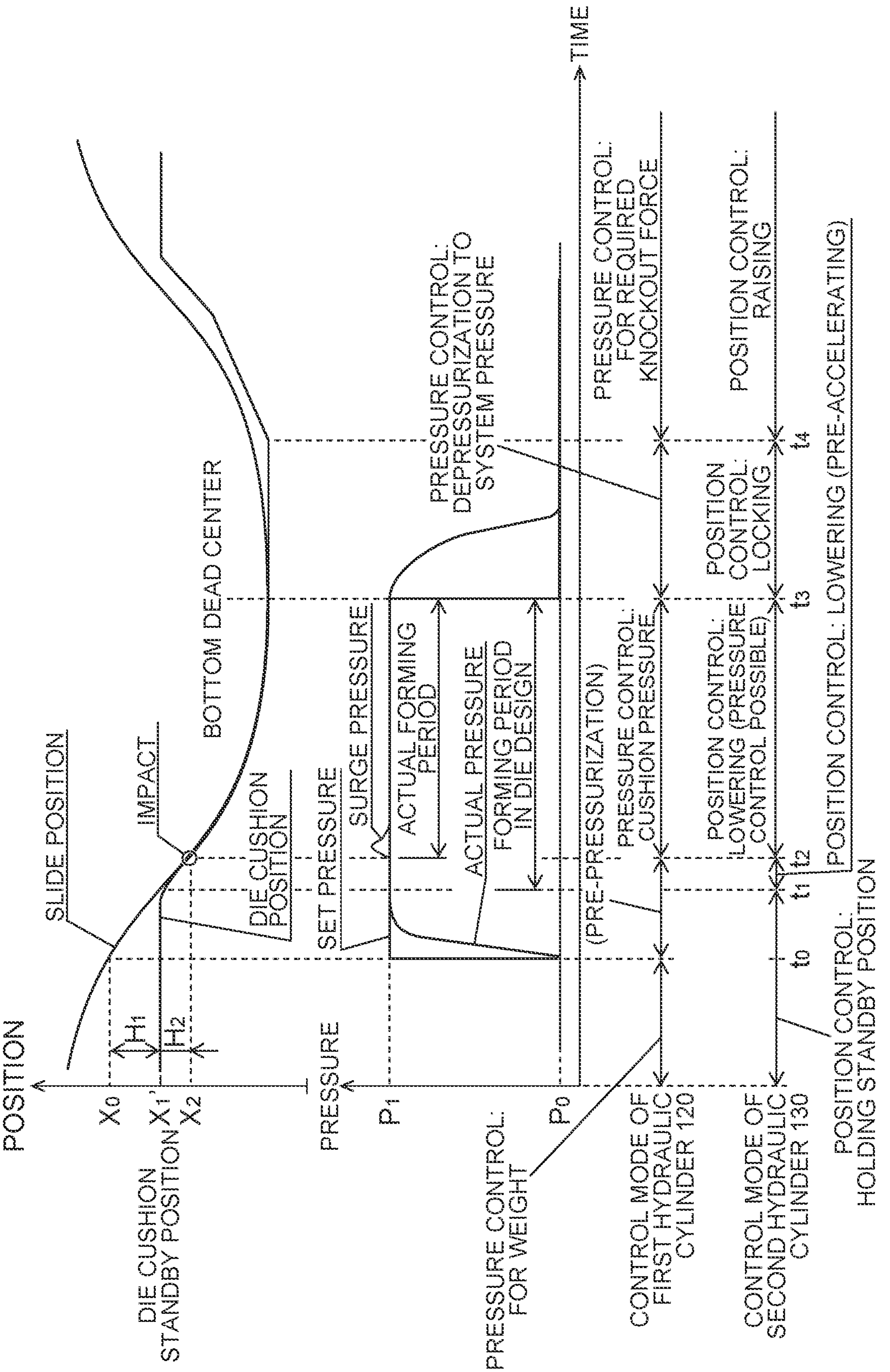
FIG. 9 is a waveform diagram showing the slide position, the die cushion position, pressure commands (set pressures), and the actual pressure in one press cycle when the die cushion device is controlled by a second control method.

FIG. 9 is a waveform diagram showing the slide position, the die cushion position, pressure commands (set pressures), and the actual pressure in one press cycle when the die cushion device is controlled by the second control method.

The second control method of the die cushion device is different from the first control method of the die cushion device described with reference to FIG. 5 in that a control for pre-accelerating the cushion pad 110 is added before press forming. Note that, in the second control method of the die cushion device, detailed description on the parts common to the first control method is omitted.

As shown in FIG. 9, the die cushion standby position $X_1'$ is at a position higher by a height $H_2$ than the impact position $X_2$ where a press forming starts.

When the slide 20 is moved downward and the slide position reaches the position $X_0$ (time $t_0$ in FIG. 9) which is higher than the die cushion standby position $X_1'$ by a height $H_1$, similarly to the first control method, the first controller 160 starts pre-pressurization for pressurizing the lower chamber 120A of the first hydraulic cylinder 120 to the set pressure $P_1$. The second controller 170 performs position control on the second hydraulic cylinder 130 so that the cushion pad 110 is held at the die cushion standby position $X_1'$.

Subsequently, before the slide position reaches the impact position (the time $t_1$ in FIG. 9), the die cushion position commander 172 of the second controller 170 outputs a second die cushion position command for pre-accelerating the cushion pad 110, instead of the outputting the first die cushion position command indicating the die cushion standby position $X_1'$.

The second controller 170 performs position control on the second hydraulic cylinder 130 so that the cushion pad 110 is accelerated (pre-accelerated) before the impact based on the second die cushion position command.

Figure 10:
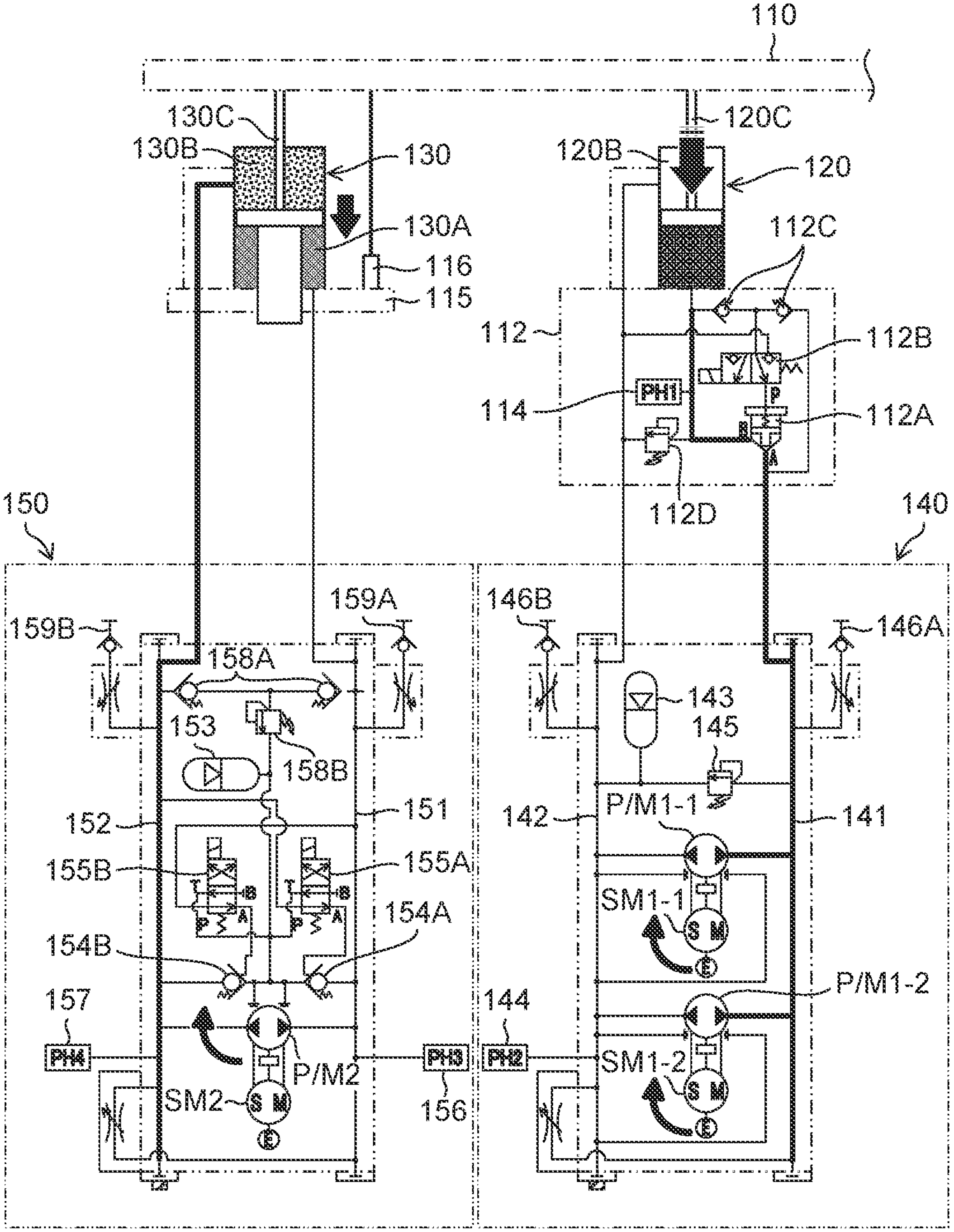
FIG. 10 is a diagram showing the drive part of the die cushion device similar to FIG. 2 and is a diagram mainly showing an operation state of the first and second hydraulic cylinders and so on while the cushion pad is pre-accelerated.

FIG. 10 is a diagram showing a drive part of the die cushion device similar to that of FIG. 2, and mainly shows the operation states of the first and second hydraulic cylinders and the like while the cushion pad is pre-accelerated.

The second controller 170 performs position control on the second hydraulic cylinder 130 by the second die cushion position command for pre-accelerating the cushion pad 110. In other words, the second controller 170 controls the second servomotor (SM2), so that hydraulic oil is supplied from the second hydraulic pump/motor (P/M2) to the upper chamber 130B of the second hydraulic cylinder 130 in order to move the cushion pad 110 downward (pre-accelerate the cushion pad 110 downward) by the second hydraulic cylinder 130.

The first controller 160 continuously performs pressure control during pre-acceleration so that the pressure in the lower chamber 120A of the first hydraulic cylinder 120 becomes the set pressure $P_1$ for the pre-pressurization. The torque output direction of the first servomotors (SM1-1, SM1-2) when the cushion pad 110 is held in the die cushion standby position is opposite to the torque output direction of the first servomotor (SM1-1, SM1-2) during pre-acceleration.

After that, when the slide position reaches the impact position $X_2$ (time $t_2$ in FIG. 9) where a press forming starts, the second controller 170 performs position control on the second hydraulic cylinder 130 based on the die cushion position command (third die cushion position command) corresponding to the current slide position. Therefore, it is possible to prevent the second controller 170 from interfering with the die cushion force generated by the first hydraulic cylinder 120. Furthermore, the second controller 170 may be configured to switch the control of the second hydraulic cylinder 130 from position control to pressure control at the time of impact.

On the other hand, the first controller 160 continuously performs pressure control on the first hydraulic cylinder 120 in the same manner as pressure control during pre-acceleration.

A time $t_3$ on FIG. 9 is the time when the slide position reaches the bottom dead center, and a time $t_4$ is the time when the locking ends. At these time $t_3$ and time $t_4$, similarly to the first control method, the first controller 160 and the second controller 170 switch between different pressure commands and position commands to perform pressure control and position control.

Note that, in position control for pre-accelerating the cushion pad 110 by the second controller 170, it is preferable to reduce the difference between the speed of the slide 20 and the speed of the cushion pad 110 at the time of impact.

According to the second control method of the die cushion device, since the lower chamber 120A of the first hydraulic cylinder 120 is pre-pressurized so as to have the set pressure $P_1$ and the cushion pad 110 is pre-accelerated, press forming may be started with the die cushion force required for forming from the moment of impact, and the surge pressure at the time of impact may be further reduced.

[First and Second Hydraulic Circuits According to Second Embodiment]

Figure 11:
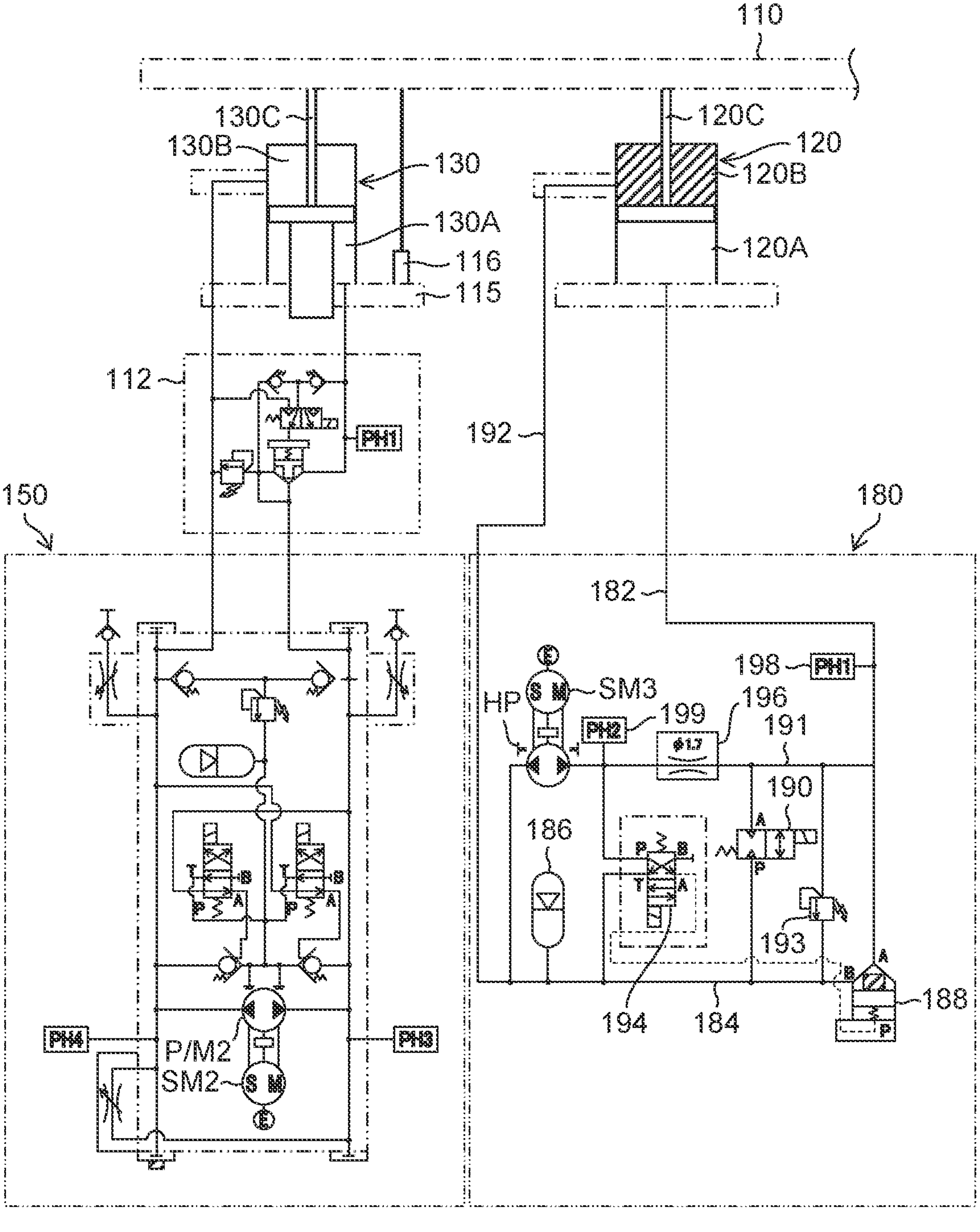
FIG. 11 is a diagram showing the first and second hydraulic cylinders in the die cushion device shown in FIG. 1, and a first and a second hydraulic circuits for driving the first and second hydraulic cylinders, according to a second embodiment.

FIG. 11 is a diagram showing the first and second hydraulic cylinders of the die cushion device shown in FIG. 1, and the first and second hydraulic circuits for driving the first and second hydraulic cylinders, according to the second embodiment. Note that, in FIG. 11, the parts common to the first and second hydraulic circuits according to the first embodiment shown in FIG. 2 are designated by the same reference numerals and characters, and detailed description thereon is to be omitted.

In the second embodiment shown in FIG. 11, the hydraulic circuit (first hydraulic circuit) 180 is different from the first hydraulic circuit 140 of the first embodiment shown in FIG. 2. In addition, the hydraulic circuit 112 that supports the weight including the cushion pad 110 is provided between the second hydraulic cylinder 130 and the second hydraulic circuit 150.

In FIG. 11, the hydraulic circuit 180 is a hydraulic closed circuit including: a die cushion pressure generation line 182 connected to the lower chamber 120A of the first hydraulic cylinder 120; a system pressure line 184 to which an accumulator (first accumulator) 186 for accumulating the hydraulic fluid with the system pressure (first system pressure) is connected; a pilot-operated logic valve (pilot logic valve) 188 which has an A port connected to the die cushion pressure generation line 182 and a B port connected to system pressure line 184; a first solenoid valve 190 that opens and closes the flow path between the die cushion pressure generation line 182 and the system pressure line 184; a third servomotor (SM3) and a hydraulic pump (HP) that function as a pressure generator that generates pilot pressure acting on a pilot port P of the logic valve 188; and a first hydraulic line 191 connecting the hydraulic pump (HP) and the die cushion pressure generation line 182.

In addition, the hydraulic circuit 180 includes: a second hydraulic line (second hydraulic line) 192 connecting the upper chamber 120B of the first hydraulic cylinder 120 and the system pressure line 184 (accumulator 186); a relief valve 193 disposed between the die cushion pressure generation line 182 (first hydraulic line 191) and the system pressure line 184; a second solenoid valve 194 for selectively applying the system pressure or the pilot pressure to the pilot port P of logic valve 188; an orifice 196 which is disposed in the first hydraulic line 191 and functions as a throttle; a pressure detector (first pressure detector) 198 for detecting the pressure in the lower chamber 120A of the first hydraulic cylinder 120; and a pressure detector 199 for detecting the pressure (pilot pressure) of the hydraulic oil generated by the hydraulic pump (HP).

The hydraulic circuit 180 is configured to control the pilot pressure to be applied to the pilot port P of the logic valve 188 so as to be able to control the die cushion pressure corresponding to the die cushion force during press forming. In addition, the hydraulic pump (HP) is connected to the die cushion pressure generation line 182 (lower chamber 120A of the first hydraulic cylinder 120) via the first hydraulic line 191 in which the orifice 196 is disposed. Therefore, the hydraulic pump (HP) may supply the hydraulic oil to the lower chamber 120A of the first hydraulic cylinder 120 before the impact so that the lower chamber 120A of the first hydraulic cylinder 120 is pre-pressurized to have a preset pressure before impact.

Figure 12:
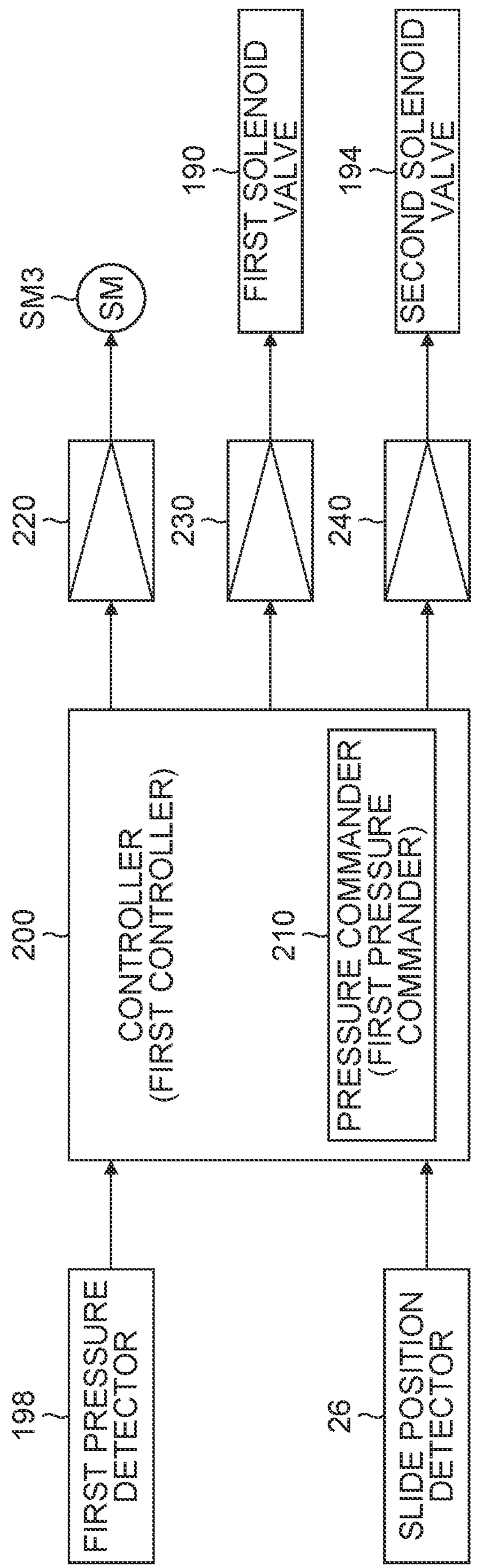
FIG. 12 is a block diagram showing the first controller according to the second embodiment.

FIG. 12 is a block diagram showing the first controller according to the second embodiment.

As shown in FIG. 12, the controller (first controller) 200 receives: the pressure signal indicating the pressure of the lower chamber 120A of the first hydraulic cylinder 120 from the pressure detector 198; and the slide position signal indicating the position of the slide 20 from the slide position detector 26.

The controller 200 includes a pressure commander (first pressure commander) 210, and the pressure commander 210 receives a slide position signal detected by the slide position detector 26 in order to output a pressure command (including a die cushion pressure command) according to the position of the slide 20.

The pressure commander 210 is equivalent to the first pressure commander 162 shown in FIG. 3. The pressure commander 210 outputs: the first pressure command for indicating the die cushion pressure corresponding to the die cushion force during press forming; a second pressure command for pre-pressurizing the lower chamber 120A of the first hydraulic cylinder 120 to a preset pressure before press forming; and the like. The pressure commander 210 also controls the output timing of the first pressure command, the second pressure command, and the like based on the slide position signal.

The controller 200 calculates a torque command for driving the third servomotor (SM3) in order to control the pressure of the lower chamber 120A of the first hydraulic cylinder 120 according to the pressure command, based on the pressure command output from the pressure commander 210 and the pressure signal indicating the pressure of the lower chamber 120A of the first hydraulic cylinder 120 detected by the pressure detector 198.

The controller 200 outputs the torque command calculated using the pressure command, pressure signal, and the like to the third servomotor (SM3) via the amplifier 220 to drive the hydraulic pump (HP) via the third servomotor (SM3), so as to cause the hydraulic pump (HP) to discharge the hydraulic oil with the required pressure.

When the controller 200 performs pressure control on the first hydraulic cylinder 120, the controller 200 turns off both the first solenoid valve 190 and the second solenoid valve 194 (switching positions shown in FIG. 11) to cause the first solenoid valve 190 to close the flow path between the die cushion pressure generation line 182 and the system pressure line 184. In addition, the controller 200 applies the hydraulic oil pressure (pilot pressure) adjusted by the hydraulic pump (HP) to the pilot port P of the logic valve 188 via the second solenoid valve 194.

In a case where pre-pressurizing is performed so that the lower chamber 120A of the first hydraulic cylinder 120 has the set pressure $P_1$ before impact, the controller 200 calculates the torque command for driving the third servomotor (SM3) based on the pressure command (second pressure command for pre-pressurization) output from the pressure commander 210 and the pressure signal indicating the pressure of the lower chamber 120A of the first hydraulic cylinder 120 detected by the pressure detector 198, and drives the third servomotor (SM3) by the calculated torque command. Therefore, it is possible to supply the hydraulic oil with the pressure corresponding to the drive torque of the third servomotor (SM3) from the hydraulic pump (HP) axially connected to the third servomotor (SM3) to the lower chamber 120A of the first hydraulic cylinder 120 via the first hydraulic line 191 having the orifice 196 and the die cushion pressure generation line 182, and pressure control is performed so that the lower chamber 120A of the first hydraulic cylinder 120 has the set pressure $P_1$.

During pressure control for pre-pressurization, the cushion pad 110 is held at the die cushion standby position by the second hydraulic cylinder 130 on which position control is performed by the second hydraulic circuit 150 and the second controller 170. Therefore, the cushion pad 110 is not moved upward even when the lower chamber 120A of the first hydraulic cylinder 120 is pre-pressurized before impact (that is, pre-pressurization can be performed). In addition, during pre-pressurization, because the logic valve 188 may be closed by the pressure (pilot pressure) from the hydraulic pump (HP) applied to the pilot port P of the logic valve 188 via the second solenoid valve 194, the lower chamber 120A of the first hydraulic cylinder 120 may be pre-pressurized.

Next, the control of the die cushion pressure during press forming will be described.

When the slide position reaches the impact position, the cushion pad 110 is then moved downward together with the slide 20 (due to the downward pushing force from the slide 20) as the slide 20 is moved downward.

In this case, the controller 200 calculates the torque command for driving the third servomotor (SM3) based on the pressure command output from the pressure commander 210 (the first pressure command indicating the die cushion pressure corresponding to the die cushion force) and the pressure signal indicating the pressure of the lower chamber 120A of the first hydraulic cylinder 120 detected by the pressure detector 198, and drives the third servomotor (SM3) according to the calculated torque command. As a result, the pressure (pilot pressure) to be applied to the pilot port P of the logic valve 188 from the hydraulic pump (HP) axially connected to the third servomotor (SM3) via the second solenoid valve 194 is appropriately adjusted, so that the logic valve 188 is controlled to open and close.

When the logic valve 188 closes due to the pilot pressure, the pressure of the lower chamber 120A of the first hydraulic cylinder 120 increases due to the downward pushing force applied from the slide 20. Subsequently, when the pressure signal detected by the pressure detector 198 becomes larger than the pressure command, the controller 200 drives the third servomotor (SM3) and hydraulic pump (HP) to decrease the pilot pressure applied to the pilot port P, so that the logic valve 188 is opened by the decrease in pilot pressure. When the logic valve 188 is opened, hydraulic oil flows from the lower chamber 120A of the first hydraulic cylinder 120 to the system pressure line 184 via the die cushion pressure generation line 182, and the A port and B port of the logic valve 188, so as to decrease the pressure in the lower chamber 120A of the first hydraulic cylinder 120.

In this way, according to the balance between the die cushion pressure (pressure at the A port of the logic valve 188) applied to the lower chamber 120A of the first hydraulic cylinder 120 and the pilot pressure (pressure at the pilot port P of the logic valve 188), the logic valve 188 is opened and closed to control the pressure in the lower chamber 120A of the first hydraulic cylinder 120, which is the pressure on the A port side of the hydraulic oil flowing from the A port to B port of the logic valve 188, to be the pressure corresponding to the pressure command. In other words, the die cushion pressure applied to the lower chamber 120A of the first hydraulic cylinder 120 is controlled by the pilot pressure applied to the pilot port P of the logic valve 188.

Note that the control is not limited to controlling die cushion pressure during press forming. The pre-pressurization during pre-acceleration performed by driving the second hydraulic cylinder 130 may also be controlled by the pilot pressure applied to the pilot port P of the logic valve 188.

Next, when the slide position reaches the bottom dead center, the controller 200 outputs a drive signal for turning on the first solenoid valve 190 and the second solenoid valve 194 to the first solenoid valve 190 and the second solenoid valve 194 via the amplifiers 230 and 240 in order to end the control state of die cushion pressure.

When the first solenoid valve 190 and the second solenoid valve 194 each receive a drive signal, they are turned on, and the valve positions are switched from the state shown in FIG. 11. Therefore, the first solenoid valve 190 is opened to release the flow path between the die cushion pressure generation line 182 and the system pressure line 184. In addition, the second solenoid valve 194 is switched so that the system pressure accumulated in the accumulator 186 is applied to the pilot port P of the logic valve 188 via the second solenoid valve 194. Here, when the slide position reaches the bottom dead center, because it is not necessary to apply the pilot pressure to the pilot port P of the logic valve 188, the third servomotor (SM3) is stopped.

In a case where the first solenoid valve 190 is opened to release the flow path between the die cushion pressure generation line 182 and the system pressure line 184, the lower chamber 120A of the first hydraulic cylinder 120 and the system pressure line 184 are connected to each other and the lower chamber 120A of the first hydraulic cylinder 120 is depressurized to have the system pressure.

On the other hand, as described above, when the slide position reaches the bottom dead center, the locking control at the bottom dead center is performed for a certain period of time. After the locking control, position control is performed on the second hydraulic cylinder 130 so as to move the cushion pad 110 upward to position the cushion pad 110 at the die cushion standby position again. In this case, because the lower chamber 120A of the first hydraulic cylinder 120 is connected to the system pressure line 184 via the die cushion pressure generation line 182 and the first solenoid valve 190, and the upper chamber 120B of the first hydraulic cylinder 120 is connected to the system pressure line 184 via the second hydraulic line 192, the first hydraulic cylinder 120 does not prevent the cushion pad 110 from moving upward. In other words, in the upper chamber 120B and the lower chamber 120A of the first hydraulic cylinder 120, the hydraulic oil freely flows in and out together with upward movement of the cushion pad 110.

According to the hydraulic circuit (first hydraulic circuit) 180 according to the second embodiment shown in FIG. 11, the logic valve 188 provides high-pressure and large-flow hydraulic oil discharged from the lower chamber 120A of the first hydraulic cylinder 120 for controlling die cushion pressure during press forming. Therefore, the speed of the slide 20 may be increased in the die cushioning process.

In addition, because the third servomotor (SM3) and hydraulic pump (HP) control a small flow rate for providing the pilot pressure, it is possible to generate the die cushion pressure equivalent to the first embodiment, using the third servomotor (SM3) and hydraulic pump (HP) having smaller capacity than the capacity of the two first hydraulic pumps/motors (P/M1-1, P/M1-2) and two first servomotors (SM1-1, SM1-2) of the first hydraulic circuit 140 according to the first embodiment shown in FIG. 2 and so on. Therefore, as a whole, the number of the first hydraulic pumps/motors and the first servomotors may be drastically reduced, so that the hydraulic circuit may be implemented with reduced cost.

Note that the hydraulic circuit 180 according to the second embodiment having the logic valve 188 does not have an ability to move the cushion pad 110 upwards, however the second hydraulic cylinder 130 that performs position control on the cushion pad 110 can move the cushion pad 110 upward. In particular, the cross-sectional area of the lower chamber 130A of the second hydraulic cylinder 130 is reduced so that the cushion pad 110 may be moved upward at high speed.

[Others]

In this embodiment, one first hydraulic cylinder 120 that is subjected to pressure control and one second hydraulic cylinder 130 that is mainly subjected to position control, are provided for the cushion pad 110. However, the number of first hydraulic cylinders 120, and the number of the second hydraulic cylinders 130 are not limited to this example.

In addition, the first hydraulic circuit 140 uses two servomotors and two hydraulic pumps/motors in parallel for one first hydraulic cylinder 120, however the present invention is not limited to this example. Any number of servomotors and hydraulic pumps/motors may be provided.

Similarly, the second hydraulic circuit 150 uses one servomotor and one hydraulic pump/motor for one second hydraulic cylinder 130, however the present invention is not limited to this example. Any number of servomotors and hydraulic pumps/motors may be provided. Furthermore, the pressure generator that generates the pilot pressure acting on the pilot port P of the logic valve 188 is not limited to the one using the third servomotor (SM3) and hydraulic pump (HP).

Furthermore, the hydraulic circuit 180 functioning as the first hydraulic circuit shown in FIG. 11 is one example of the hydraulic circuit in which the die cushion pressure is controlled by the pilot logic valve 188, however the present invention is not limited to this hydraulic circuit 180. Any hydraulic circuit may be used as long as the hydraulic circuit uses a pilot logic valve and controls the die cushion pressure by controlling the pilot pressure applied to the pilot port of the logic valve.

In addition, the description explains about the case in which oil is used as the hydraulic fluid for the first and second hydraulic cylinders and the first and second hydraulic pumps/motors, however the present invention is not limited to this example, and water or other liquids may be used as hydraulic fluid.

Furthermore, it goes without saying that the present invention is not limited to the above-described embodiments, and various modifications may be made without departing from the spirit of the present invention.

REFERENCE SIGNS LIST

10 press machine
12 column
14 bed
18 guide part
20 slide
22 crankshaft
24 connecting rod
26 slide position detector
28 crankshaft encoder
30 upper die
32 bolster
34 lower die
100 die cushion device
102 blank holder
104 cushion pin
110 cushion pad
112 hydraulic circuit
114 first pressure detector
115 fixing part
116 die cushion position detector
120 first hydraulic cylinder
120A lower chamber
120B upper chamber
120C piston rod
130 second hydraulic cylinder
130A lower chamber
130B upper chamber
130C piston rod
140 first hydraulic circuit
141 die cushion pressure generation line
142 system pressure line
143 first accumulator
144 first pressure detector
150 second hydraulic circuit
151, 152 hydraulic line
153 second accumulator
154A first pilot check valve
154B second pilot check valve
155A, 155B solenoid valve
156 second pressure detector
157 third pressure detector
160 first controller
162 first pressure commander
164, 165, 175 amplifier/PWM controller
166, 176 DC power supply device with power regeneration function
167, 177 AC power supply
170 second controller
170A die cushion position control unit
170B die cushion pressure control unit
171 die cushion position controller
172 die cushion position commander
173 die cushion pressure controller
174 second pressure commander
178, 179 amplifier
180 hydraulic circuit
182 die cushion pressure generation line
184 system pressure line
186 accumulator
188 logic valve
190 first solenoid valve
191 first hydraulic line
192 second hydraulic line
194 second solenoid valve
196 orifice
198, 199 pressure detector
200 controller
210 pressure commander
220 amplifier
P/M1-1, P/M1-2 first hydraulic pumps/motors
SM1-1, SM1-2 first servomotors
P/M2 second hydraulic pump/motor
SM2 second servomotor
HP hydraulic pump
SM3 third servomotor

What is claimed is:

1. A die cushion device comprising:

a first hydraulic cylinder configured to support a cushion pad and generate a die cushion force on the cushion pad in a case where a slide of a press machine is moved downward;

a first hydraulic circuit configured to drive the first hydraulic cylinder;

a first pressure commander configured to output a first pressure command indicating a die cushion pressure corresponding to the die cushion force;

a first pressure detector configured to detect a pressure applied to a lower chamber of the first hydraulic cylinder;

a first controller configured to control the first hydraulic circuit based on the first pressure command and the pressure detected by the first pressure detector, in such a manner that the pressure applied to the lower chamber of the first hydraulic cylinder matches a pressure corresponding to the first pressure command;

a second hydraulic cylinder configured to support the cushion pad and move the cushion pad in an up-and-down direction;

a second hydraulic circuit configured to drive the second hydraulic cylinder;

a die cushion position commander configured to output a die cushion position command indicating a position of the cushion pad;

a die cushion position detector configured to detect a position of the cushion pad; and a second controller configured to control the second hydraulic circuit based on the die cushion position command and the position of the cushion pad detected by the die cushion position detector, in such a manner that the position of the cushion pad matches a position corresponding to the die cushion position command, wherein:

the first pressure commander outputs a second pressure command for pre-pressurizing the lower chamber of the first hydraulic cylinder to a preset pressure before press forming;

the die cushion position commander outputs a first die cushion position command for causing the cushion pad to stand by at a die cushion standby position before press forming;

the first controller controls the first hydraulic circuit based on the second pressure command and the pressure detected by the first pressure detector, to pre-pressurize the lower chamber of the first hydraulic cylinder to a pressure corresponding to the second pressure command; and the second controller controls the second hydraulic circuit based on the first die cushion position command, to cause the cushion pad to stand by at the die cushion standby position.

2. The die cushion device according to claim 1, wherein pressure control on the first hydraulic cylinder by the first controller and the first hydraulic circuit is performed simultaneously with position control on the second hydraulic cylinder by the second controller and the second hydraulic circuit.

3. The die cushion device according to claim 1, wherein the first hydraulic circuit includes:

a die cushion pressure generation line connected to the lower chamber of the first hydraulic cylinder;

a system pressure line to which an upper chamber of the first hydraulic cylinder and a first accumulator for accumulating a hydraulic fluid with a first system pressure are individually connected;

a first hydraulic pump/motor connected between the die cushion pressure generation line and the system pressure line; and a first servomotor connected to a rotating shaft of the first hydraulic pump/motor, and the first controller controls a torque of the first servomotor based on the first pressure command or the second pressure command, and the pressure detected by the first pressure detector.

4. The die cushion device according to claim 1, wherein the first hydraulic circuit is a hydraulic closed circuit including:

a die cushion pressure generation line connected to the lower chamber of the first hydraulic cylinder;

a system pressure line to which a first accumulator configured to accumulate a hydraulic fluid with a first system pressure is connected;

a logic valve configured to be pilot-operated, the logic valve having an A port connected to the die cushion pressure generation line and a B port connected to the system pressure line;

a first solenoid valve configured to open and close a flow path between the die cushion pressure generation line and the system pressure line;

a pressure generator configured to generate a pilot pressure acting on a pilot port of the logic valve; and a first hydraulic line connecting the pressure generator and the die cushion pressure generation line, and the first controller is further configured to:

control the pilot pressure based on the first pressure command or the second pressure command, and the pressure detected by the first pressure detector; and control a pressure in the lower chamber of the first hydraulic cylinder, which is a pressure on a side of the A port of the logic valve so as to correspond to the first pressure command or the second pressure command.

5. The die cushion device according to claim 4, wherein a throttle is disposed in the first hydraulic line.

6. The die cushion device according to claim 4, wherein the first hydraulic circuit has a second hydraulic line connecting an upper chamber of the first hydraulic cylinder and the system pressure line.

7. The die cushion device according to claim 4, wherein the first hydraulic circuit has a second solenoid valve configured to selectively cause the first system pressure or the pilot pressure to act on the pilot port of the logic valve.

8. The die cushion device according to claim 4, wherein the pressure generator includes:

a hydraulic pump disposed between the system pressure line and the pilot port of the logic valve; and a third servomotor connected to a rotating shaft of the hydraulic pump, and the first controller controls a torque of the third servomotor based on the first pressure command or the second pressure command and the pressure detected by the first pressure detector, to control the pilot pressure.

9. The die cushion device according to claim 1, wherein:

the die cushion standby position is a position above an impact position where press forming starts;

the die cushion position commander outputs the first die cushion position command, and subsequently outputs a second die cushion position command for pre-accelerating the cushion pad before a position of the slide reaches the impact position; and the second controller controls the second hydraulic circuit based on the second die cushion position command, to pre-accelerate the cushion pad during a period over which the cushion pad reaches the impact position from the die cushion standby position.

10. The die cushion device according to claim 1, further comprising:

a second pressure commander configured to output a third pressure command indicating a preset third pressure; and a second pressure detector configured to detect a pressure in a lower chamber of the second hydraulic cylinder, wherein the second controller controls the second hydraulic circuit during press forming based on the third pressure command and the pressure detected by the second pressure detector, in such a manner that the lower chamber of the second hydraulic cylinder has the third pressure corresponding to the third pressure command.

11. The die cushion device according to claim 10, wherein the third pressure command is a pressure command corresponding to an auxiliary die cushion force that assists a main die cushion force generated by the first hydraulic cylinder, or a pressure command for making a die cushion force generated by the second hydraulic cylinder zero.

12. The die cushion device according to claim 1, wherein the die cushion position commander outputs a third die cushion position command corresponding to a position of the slide during press forming, and the second controller controls the second hydraulic circuit during press forming based on the third die cushion position command, to move the cushion pad to a die cushion position corresponding to the position of the slide.

13. The die cushion device according to claim 1, wherein:

in a case where the slide reaches a bottom dead center, the die cushion position commander outputs a fourth die cushion position command for holding the cushion pad at a position corresponding to the bottom dead center for a certain period of time, and subsequently outputs a fifth die cushion position command for moving the cushion pad to the die cushion standby position; and in a case where the slide reaches the bottom dead center, the second controller controls the second hydraulic circuit based on the fourth die cushion position command and the fifth die cushion position command, to hold the cushion pad at a position corresponding to the bottom dead center for a certain period of time, and subsequently move the cushion pad to the die cushion standby position.

14. The die cushion device according to claim 1, wherein the second hydraulic circuit includes:

a second hydraulic pump/motor connected between an upper chamber and a lower chamber of the second hydraulic cylinder;

a second servomotor connected to a rotating shaft of the second hydraulic pump/motor;

a second accumulator configured to accumulate a hydraulic fluid with a second system pressure;

a first pilot check valve provided in a flow path between the lower chamber of the second hydraulic cylinder and the second accumulator; and a second pilot check valve provided in a flow path between the upper chamber of the second hydraulic cylinder and the second accumulator, and in a first direction when a hydraulic fluid is supplied from the second hydraulic pump/motor to the upper chamber of the second hydraulic cylinder, the second controller rotates the second servomotor in a first direction to supply the hydraulic fluid from the second hydraulic pump/motor to the upper chamber of the second hydraulic cylinder, and accumulates the hydraulic fluid discharged from the lower chamber of the second hydraulic cylinder via the first pilot check valve, in the second accumulator, and in a case where the hydraulic fluid is supplied from the second hydraulic pump/motor to the lower chamber of the second hydraulic cylinder, the second controller supplies the hydraulic fluid from the second hydraulic pump/motor to the lower chamber of the second hydraulic cylinder, and accumulates the hydraulic fluid discharged from the upper chamber of the second hydraulic cylinder, in the second accumulator via the second pilot check valve.

* * * * *